United States Patent
Nakanishi

(10) Patent No.: US 10,170,243 B2
(45) Date of Patent: Jan. 1, 2019

(54) MULTILAYER CERAMIC CAPACITOR

(71) Applicant: Murata Manufacturing Co., Ltd., Nagaokakyo-shi, Kyoto-fu (JP)

(72) Inventor: Toru Nakanishi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/690,586

(22) Filed: Aug. 30, 2017

(65) Prior Publication Data
US 2018/0075968 A1 Mar. 15, 2018

(30) Foreign Application Priority Data

Sep. 13, 2016 (JP) .................................. 2016-178687

(51) Int. Cl.
| | |
|---|---|
| *H01G 4/005* | (2006.01) |
| *H01G 4/232* | (2006.01) |
| *H01G 4/248* | (2006.01) |
| *H01G 4/30* | (2006.01) |
| *H01G 4/33* | (2006.01) |

(52) U.S. Cl.
CPC ............. *H01G 4/005* (2013.01); *H01G 4/232* (2013.01); *H01G 4/248* (2013.01); *H01G 4/306* (2013.01); *H01G 4/33* (2013.01)

(58) Field of Classification Search
CPC .......... H01G 4/005; H01G 4/012; H01G 4/30; H01G 4/33; H01G 4/12; H01G 4/232; H01G 4/248
See application file for complete search history.

(56) References Cited

U.S. PATENT DOCUMENTS

| | | | | |
|---|---|---|---|---|
| 9,646,767 | B2* | 5/2017 | Kuroda | ................. H01C 7/008 |
| 2007/0247783 | A1* | 10/2007 | Shimizu | ................. H01G 4/012 |
| | | | | 361/278 |
| 2011/0002082 | A1 | 1/2011 | Bultitude et al. | |
| 2013/0033154 | A1* | 2/2013 | Sakuratani | ............... H01G 4/30 |
| | | | | 310/366 |
| 2015/0170842 | A1* | 6/2015 | An | ........................ H01G 4/30 |
| | | | | 361/321.2 |
| 2016/0111216 | A1* | 4/2016 | Lee | ........................ H01G 4/30 |
| | | | | 361/301.4 |
| 2016/0227650 | A1* | 8/2016 | Teraoka | ................. H05K 1/181 |
| 2017/0169954 | A1* | 6/2017 | Ota | ........................ H01G 4/012 |

FOREIGN PATENT DOCUMENTS

| | | |
|---|---|---|
| JP | 1-220421 A | 9/1989 |
| JP | 5-152156 A | 6/1993 |
| JP | 7-135124 A | 5/1995 |
| JP | 2002-299149 A | 10/2002 |
| JP | 2015-073115 A | 4/2015 |

* cited by examiner

*Primary Examiner* — Nguyen Ha
(74) *Attorney, Agent, or Firm* — Keating & Bennett, LLP

(57) ABSTRACT

A multilayer ceramic capacitor includes a multilayer body including dielectric layers stacked on one another, inner electrodes, and auxiliary electrodes, and outer electrodes on end surfaces of the multilayer body. The inner electrodes include first through fifth inner electrodes on different planes. The auxiliary electrodes include a first auxiliary electrode on the same plane as the first inner electrode, a second auxiliary electrode on the same plane as the second inner electrode, a third auxiliary electrode on the same plane as the third inner electrode, and a fourth auxiliary electrode on the same plane as the fourth inner electrode.

20 Claims, 18 Drawing Sheets

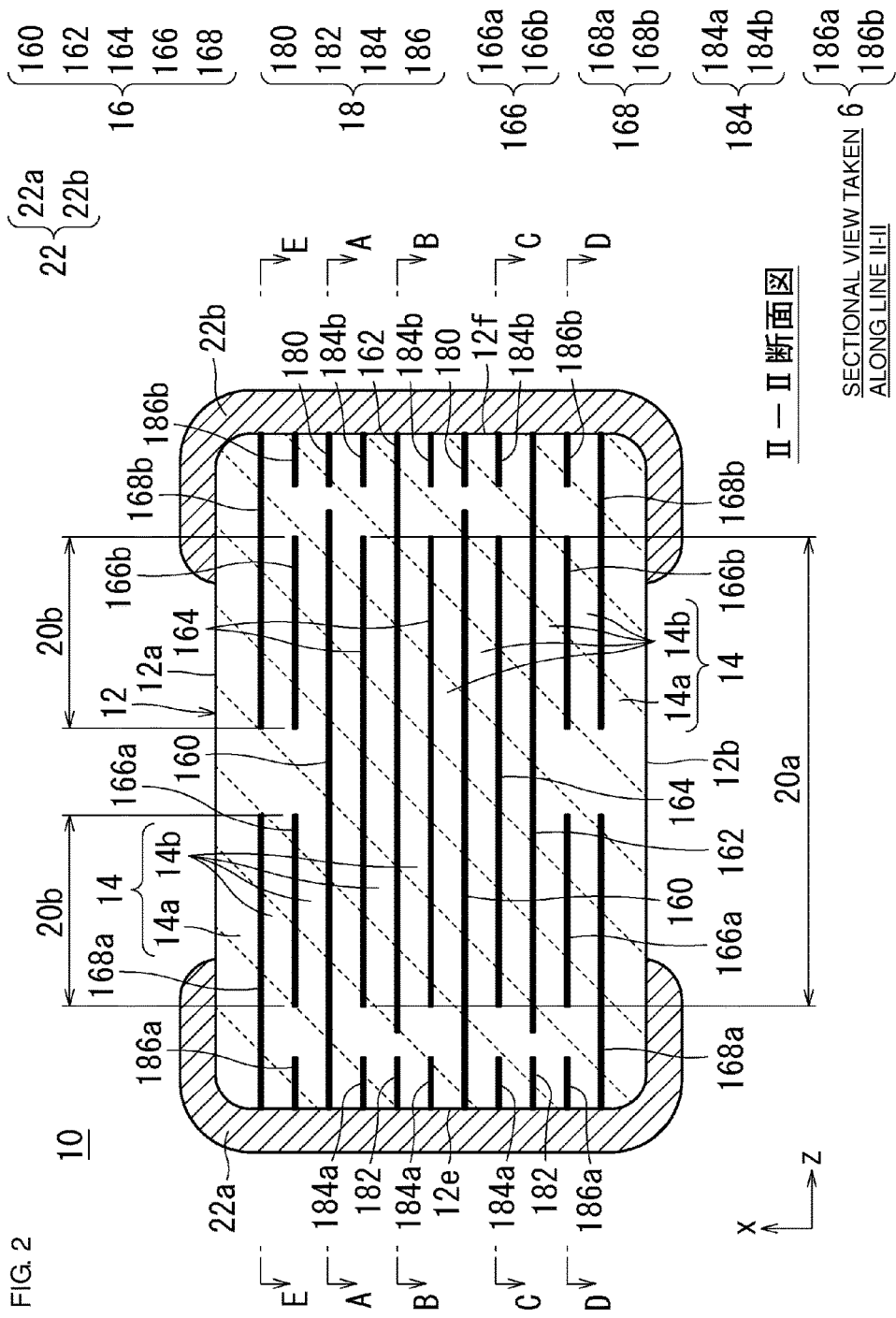

SECTIONAL VIEW TAKEN ALONG LINE A-A

FIG. 7  SECTIONAL VIEW TAKEN ALONG LINE E-E

SECTIONAL VIEW TAKEN ALONG LINE A'-A'

SECTIONAL VIEW TAKEN ALONG LINE C'-C'

SECTIONAL VIEW TAKEN ALONG LINE E'-E'

MULTILAYER CERAMIC CAPACITOR

CROSS REFERENCE TO RELATED APPLICATIONS

This application claims the benefit of priority to Japanese Patent Application No. 2016-178687 filed on Sep. 13, 2016. The entire contents of this application are hereby incorporated herein by reference.

BACKGROUND OF THE INVENTION

1. Field of the Invention

The present invention relates to a multilayer ceramic capacitor.

2. Description of the Related Art

There has been a demand for multilayer ceramic capacitors having high capacitance and high withstand voltage characteristics. In recent years, there also has been an increasing demand for compactness of multilayer ceramic capacitors, and the thickness of dielectric layers has been reduced to meet this demand. However, the reduction in the thickness of dielectric layers may result in a reduction in withstand voltage characteristics. To address this concern, for example, a multilayer ceramic capacitor disclosed in Japanese Unexamined Patent Application Publication No. 7-135124 has been proposed.

The multilayer ceramic capacitor disclosed in Japanese Unexamined Patent Application Publication No. 7-135124 is a multi-layered ceramic capacitor including a plurality of ceramic dielectric layers stacked on one another, each having an electrode pattern on a surface thereof. In the multi-layered ceramic capacitor, a plurality of parallel-connected capacitor components are formed. Some of the electrode patterns on the ceramic dielectric layers are divided into a plurality of portions so that each of the parallel-connected capacitor components is formed by connecting at least two capacitor components in series.

Specifically, as illustrated in FIG. 18, a multilayer ceramic capacitor 1 disclosed in Japanese Unexamined Patent Application Publication No. 7-135124 includes a layered dielectric body 2 and outer electrodes 3a and 3b on end surfaces of the dielectric body 2. Two first inner electrodes 4a extending from the outer electrode 3a are stacked on each other and two second inner electrodes 4b extending from the outer electrode 3b are stacked on each other, each of the first inner electrodes 4a and each of the second inner electrodes 4b being defined on the same plane. A third inner electrode 5 is sandwiched between the inner electrodes 3a and 3b so that series capacitor components are formed between the third inner electrode 5 and the inner electrodes 4a and 4b.

In the structure of the multilayer ceramic capacitor 1 disclosed in Japanese Unexamined Patent Application Publication No. 7-135124, gaps are present between the first inner electrodes 4a and the second inner electrodes 4b. The presence of gaps hinders provision of sufficient effective areas of inner electrodes between which the capacitance is generated, resulting in insufficient capacitance per unit volume of the multilayer ceramic capacitor 1. In addition to this issue, when dielectric layers and inner electrodes are stacked, a displacement between stacked layers may cause variations of the effective area of inner electrodes between the first inner electrodes 4a and the second inner electrodes 4b, and consequently a voltage is applied to either of the inner electrodes, which results in a reduction in withstand voltage characteristics.

An increase in the thickness of dielectric layers for sufficient capacitance may facilitate diffusion of inner electrodes, which may make outer electrodes and inner electrodes less likely to contact.

SUMMARY OF THE INVENTION

Accordingly, preferred embodiments of the present invention provide multilayer ceramic capacitors having sufficient capacitance per unit volume and capable of suppressing or preventing a reduction in withstand voltage characteristics.

According to a preferred embodiment of the present invention, a multilayer ceramic capacitor includes a multilayer body, inner electrodes, outer electrodes, and first to fourth auxiliary electrodes. The multilayer body includes a plurality of dielectric layers that are stacked on one another, a first main surface, a second main surface, a first side surface, a second side surface, a first end surface, and a second end surface. The first main surface and the second main surface face each other. The first side surface and the second side surface face each other. The first end surface and the second end surface face each other. The inner electrodes are stacked such that the inner electrodes and the plurality of dielectric layers are alternately arranged. The outer electrodes are disposed on at least the first end surface and the second end surface. The inner electrodes include a first inner electrode, a second inner electrode, a third inner electrode, a fourth inner electrode, and a fifth inner electrode. The first inner electrode, the second inner electrode, the third inner electrode, the fourth inner electrode, and the fifth inner electrode are disposed on different planes. The first inner electrode includes a first end and a second end, and the first end extends to the first end surface. The second inner electrode includes a first end and a second end, and the first end extends to the second end surface. The third inner electrode is arranged alternately with each of the first inner electrode and the second inner electrode. The third inner electrode includes a first end and a second end that do not extend to the first end surface or to the second end surface. The fourth inner electrode is located between the first inner electrode or the second inner electrode that is closest to the first main surface and the fifth inner electrode, and is located between the first inner electrode or the second inner electrode that is closest to the second main surface and the fifth inner electrode. The fourth inner electrode includes a first portion located near the first end surface and a second portion located near the second end surface, and the first portion and the second portion are spaced apart from each other in a center portion of the multilayer body in a length direction of the multilayer body. None of the first portion and the second portion of the fourth inner electrode extends to the first end surface or to the second end surface. The fifth inner electrode is located closest to the first main surface of the multilayer body, and is located closest to the second main surface of the multilayer body. The fifth inner electrode includes a first portion located near the first end surface and a second portion located near the second end surface, and the first portion and the second portion are spaced apart from each other in the center portion of the multilayer body in the length direction of the multilayer body. An end of the first portion of the fifth inner electrode, which is closer to the first end surface, extends to the first end surface. An end of the second portion of the fifth inner electrode, which is closer to the second end surface, extends to the second end surface.

The first auxiliary electrode is disposed on the same plane as the first inner electrode and is spaced apart from the first inner electrode. The second auxiliary electrode is disposed on the same plane as the second inner electrode and is spaced apart from the second inner electrode. The third auxiliary electrode is disposed on the same plane as the third inner electrode and has a first portion and a second portion spaced apart from each other with the third inner electrode therebetween. The fourth auxiliary electrode is disposed on the same plane as the fourth inner electrode and has a first portion and a second portion such that the first portion and the second portion of the fourth auxiliary electrode are spaced apart from the first portion and the second portion of the fourth inner electrode, respectively. The first auxiliary electrode extends to the second end surface, and the second auxiliary electrode extends to the first end surface. The first portion of the third auxiliary electrode extends to the first end surface, and the second portion of the third auxiliary electrode extends to the second end surface. The first portion of the fourth auxiliary electrode extends to the first end surface, and the second portion of the fourth auxiliary electrode extends to the second end surface.

In a multilayer ceramic capacitor according to a preferred embodiment of the present invention, the first end of the first inner electrode extends to the first end surface, the first end of the second inner electrode extends to the second end surface, and the third inner electrode is arranged alternately with each of the first inner electrode and the second inner electrode. This structure ensures a sufficient effective area of inner electrodes between which the capacitance is generated and suppresses or prevents an increase in electric field concentration at electrode end portions which may occur when the element thickness is large, which suppresses or prevents a reduction in withstand voltage which may occur when the element thickness is simply increased. Thus, it is possible to ensure capacitance. In addition, dielectric layers including the fourth and fifth inner electrodes are disposed in the outermost layer relative to the dielectric layers including the first to third inner electrodes. This structure suppresses or prevents concentration of the electric field that may occur between outer electrodes disposed on the first main surface and the first or second inner electrode closest to the first main surface and between outer electrodes disposed on the second main surface and the first or second inner electrode closest to the second main surface.

In a multilayer ceramic capacitor according to a preferred embodiment of the present invention, furthermore, the first to fourth auxiliary electrodes are included, which improve connectivity between outer electrodes and inner electrodes.

In a multilayer ceramic capacitor according to a preferred embodiment of the present invention, preferably, the first end of the first inner electrode includes a first end portion with a smaller length in a width direction between the first side surface and the second side surface than a center portion of the first inner electrode in a length direction of the first inner electrode, and the second end of the first inner electrode includes a second end portion with a smaller length in the width direction between the first side surface and the second side surface than the center portion of the first inner electrode in the length direction of the first inner electrode. Accordingly, because of the reduced width of the second end portion, both corner portions of the second end portion, which are points where the electrode concentration occurs between the first inner electrode and the outer electrodes formed on both side surfaces, are kept away from the outer electrodes within side portions of the multilayer body, and as a result, less voltage is applied to the side portions of the multilayer body. In addition, the reduced width of the first end portion increases the length of the transport path of moisture that seeps in between the outer electrodes and the multilayer body, and improves moisture resistance.

Furthermore, in a multilayer ceramic capacitor according to a preferred embodiment of the present invention, preferably, the first end of the second inner electrode includes a third end portion with a smaller length in a width direction between the first side surface and the second side surface than a center portion of the second inner electrode in a length direction of the second inner electrode, and the second end of the second inner electrode includes a fourth end portion with a smaller length in the width direction between the first side surface and the second side surface than the center portion of the second inner electrode in the length direction of the second inner electrode. Accordingly, because of the reduced width of the fourth end portion, both corner portions of the fourth end portion, which are points where the electrode concentration occurs between the second inner electrode and the outer electrodes formed on both side surfaces, are kept away from the outer electrodes within side portions of the multilayer body, and as a result less voltage is applied to the side portions of the multilayer body. In addition, the reduced width of the third end portion increases the length of the transport path of moisture that seeps in between the outer electrodes and the multilayer body, and improves moisture resistance.

Furthermore, in a multilayer ceramic capacitor according to a preferred embodiment of the present invention, preferably, the first end of the third inner electrode includes a fifth end portion with a smaller length in a width direction between the first side surface and the second side surface than a center portion of the third inner electrode in the length direction, and the second end of the third inner electrode includes a sixth end portion with a smaller length in the width direction between the first side surface and the second side surface than the center portion of the third inner electrode in the length direction. Accordingly, because of the reduced width of the fifth and sixth end portions, both corner portions of the fifth and sixth end portions, which are points where the electrode concentration occurs between the third inner electrode and the outer electrodes formed on both side surfaces, are kept away from the outer electrodes within side portions of the multilayer body, and as a result less voltage is applied to the side portions of the multilayer body.

Furthermore, in a multilayer ceramic capacitor according to a preferred embodiment of the present invention, preferably, the first portion of the fourth inner electrode includes a seventh end portion with a smaller length in a width direction between the first side surface and the second side surface than an end portion opposite to the seventh end portion, the end portion being farther from the first end surface than the seventh end portion, and the second portion of the fourth inner electrode includes an eighth end portion with a smaller length in the width direction between the first side surface and the second side surface than an end portion opposite to the eighth end portion, the end portion being farther from the second end surface than the eighth end portion.

Furthermore, in a multilayer ceramic capacitor according to a preferred embodiment of the present invention, preferably, the first portion of the fifth inner electrode includes a ninth end portion with a smaller length in a width direction between the first side surface and the second side surface than an end portion opposite to the ninth end portion, the end portion being farther from the first end surface than the ninth end portion, and the second portion of the fifth inner electrode includes a tenth end portion with a smaller length in the width direction between the first side surface and the second side surface than an end portion opposite to the tenth end portion, the end portion being farther from the second end surface than the tenth end portion.

Accordingly, the entirety of the first portion of the fourth inner electrode is able to be located between the first portion of the fifth inner electrode and the first inner electrode or the second inner electrode that are stacked vertically on the first portion of the fourth inner electrode, and the entirety of the second portion of the fourth inner electrode is able to be located between the second portion of the fifth inner electrode and the first inner electrode or the second inner electrode that are stacked vertically on the second portion of the fourth inner electrode. This structure more reliably suppresses or prevents concentration of the electric field that may occur between the outer electrodes disposed on the first main surface and the first or second inner electrode closest to the first main surface and between the outer electrodes disposed on the second main surface and the first or second inner electrode closest to the second main surface.

Furthermore, in a multilayer ceramic capacitor according to a preferred embodiment of the present invention, preferably, a length of the first end of the first inner electrode in a width direction between the first side surface and the second side surface, a length of the second end of the first inner electrode in the width direction between the first side surface and the second side surface, a length of the first auxiliary electrode in the width direction between the first side surface and the second side surface, a length of the first end of the second inner electrode in the width direction between the first side surface and the second side surface, a length of the second end of the second inner electrode in the width direction between the first side surface and the second side surface, a length of the second auxiliary electrode in the width direction between the first side surface and the second side surface, a length of the first end of the third inner electrode in the width direction between the first side surface and the second side surface, a length of the second end of the third inner electrode in the width direction between the first side surface and the second side surface, a length of the first portion of the third auxiliary electrode in the width direction between the first side surface and the second side surface, and a length of the second portion of the third auxiliary electrode in the width direction between the first side surface and the second side surface are identical or substantially identical. This structure ensures the capacitance of the multilayer ceramic capacitor.

Furthermore, in a multilayer ceramic capacitor according to a preferred embodiment of the present invention, preferably, a length of the second end of the first inner electrode in a width direction between the first side surface and the second side surface is smaller than a length of the first end of the first inner electrode in the width direction between the first side surface and the second side surface and is smaller than a length of the first auxiliary electrode in the width direction between the first side surface and the second side surface, a length of the second end of the second inner electrode in the width direction between the first side surface and the second side surface is smaller than a length of the first end of the second inner electrode in the width direction between the first side surface and the second side surface and is smaller than a length of the second auxiliary electrode in the width direction between the first side surface and the second side surface, and a length of the first end of the third inner electrode in the width direction between the first side surface and the second side surface, a length of the second end of the third inner electrode in the width direction between the first side surface and the second side surface, a length of the first portion of the third auxiliary electrode in the width direction between the first side surface and the second side surface, and a length of the second portion of the third auxiliary electrode in the width direction between the first side surface and the second side surface are each smaller than the length of the first end of the first inner electrode in the width direction between the first side surface and the second side surface, the length of the first auxiliary electrode in the width direction between the first side surface and the second side surface, the length of the first end of the second inner electrode in the width direction between the first side surface and the second side surface, and the length of the second auxiliary electrode in the width direction between the first side surface and the second side surface. This structure ensures more sufficient capacitance of the multilayer ceramic capacitor.

Furthermore, in a multilayer ceramic capacitor according to a preferred embodiment of the present invention, preferably, when viewed in a direction in which the plurality of dielectric layers are stacked on one another, the second end of the first inner electrode extends so as to be closer to the second end surface than the second end of the third inner electrode, and the second end of the second inner electrode extends so as to be closer to the first end surface than the first end of the third inner electrode. This structure is less likely to cause a change in upper and lower effective areas between the first inner electrode and the third inner electrode or between the second inner electrode and the third inner electrode even if a displacement occurs between stacked layers. As a result, voltage deviation caused by a displacement between stacked layers is less likely to occur.

According to preferred embodiments of the present invention, multilayer ceramic capacitors that achieve sufficient capacitance per unit volume and suppress or prevent a reduction in withstand voltage characteristics are provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a sectional view of the multilayer ceramic capacitor according to the first preferred embodiment of the present invention, taken along line II-II in FIG. 1A.

DETAILED DESCRIPTION OF THE PREFERRED EMBODIMENTS

Multilayer ceramic capacitors according to preferred embodiments of the present invention will be described in detail hereinafter with reference to the drawings. In the following preferred embodiments, the same or corresponding portions are designated by the same numerals throughout the figures and are not repeatedly described herein.

First Preferred Embodiment

Figure 1A:
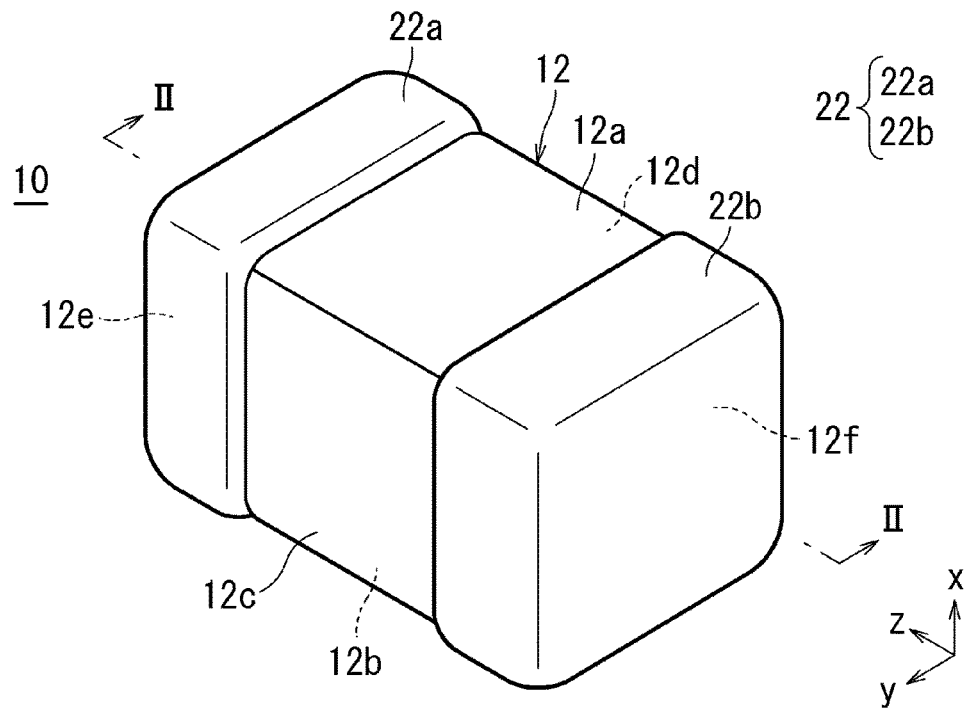
FIG. 1A is an external perspective view illustrating an example of a multilayer ceramic capacitor according to a first preferred embodiment of the present invention.
Figure 1B:
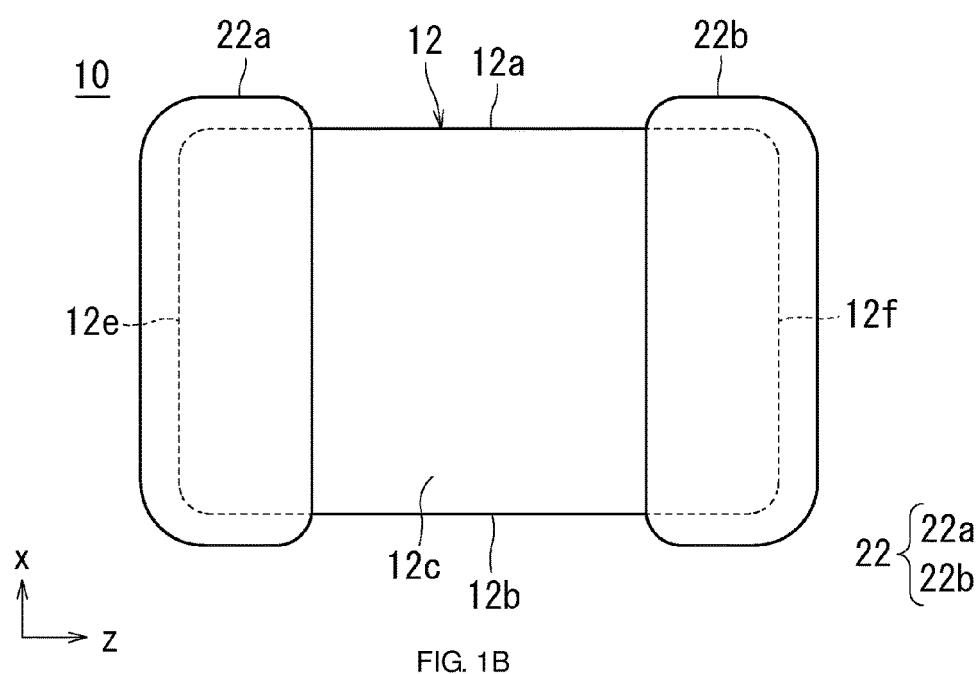
FIG. 1B is a front view of the multilayer ceramic capacitor illustrated in FIG. 1A.
Figure 3:
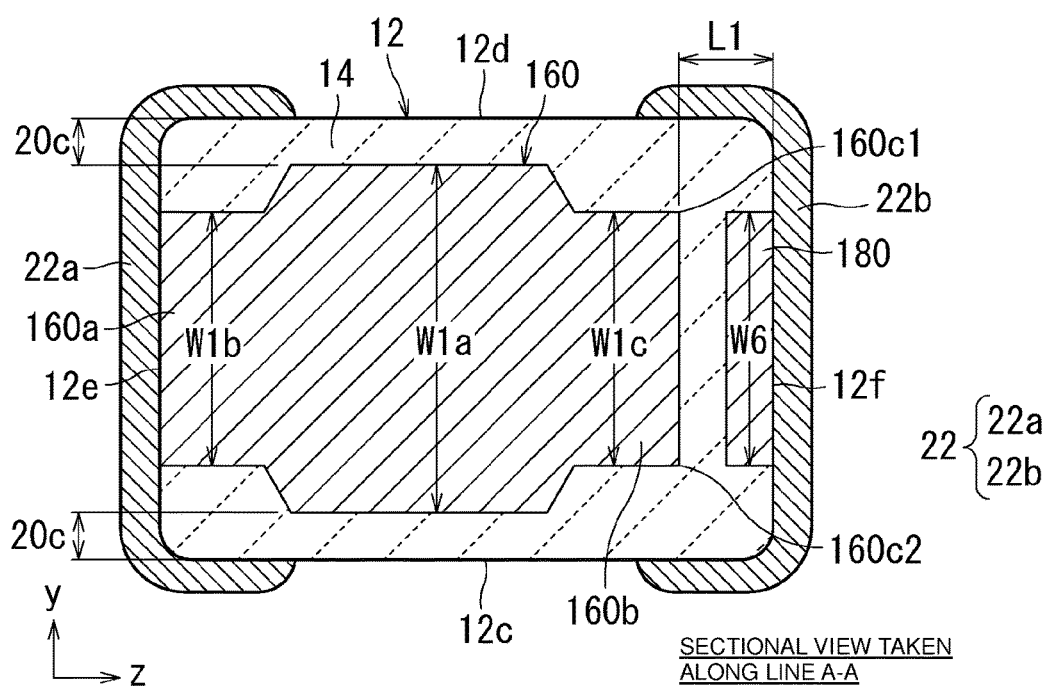
FIG. 3 is a sectional view of the multilayer ceramic capacitor according to the first preferred embodiment, taken along line A-A in FIG. 2.
Figure 4:
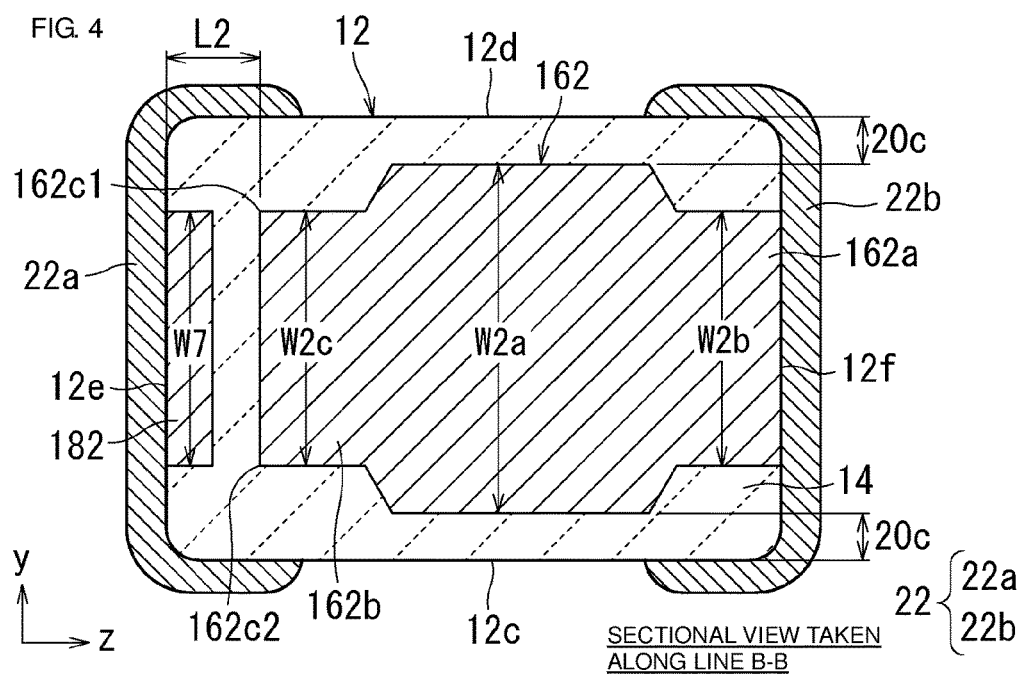
FIG. 4 is a sectional view of the multilayer ceramic capacitor according to the first preferred embodiment, taken along line B-B in FIG. 2.
Figure 5:
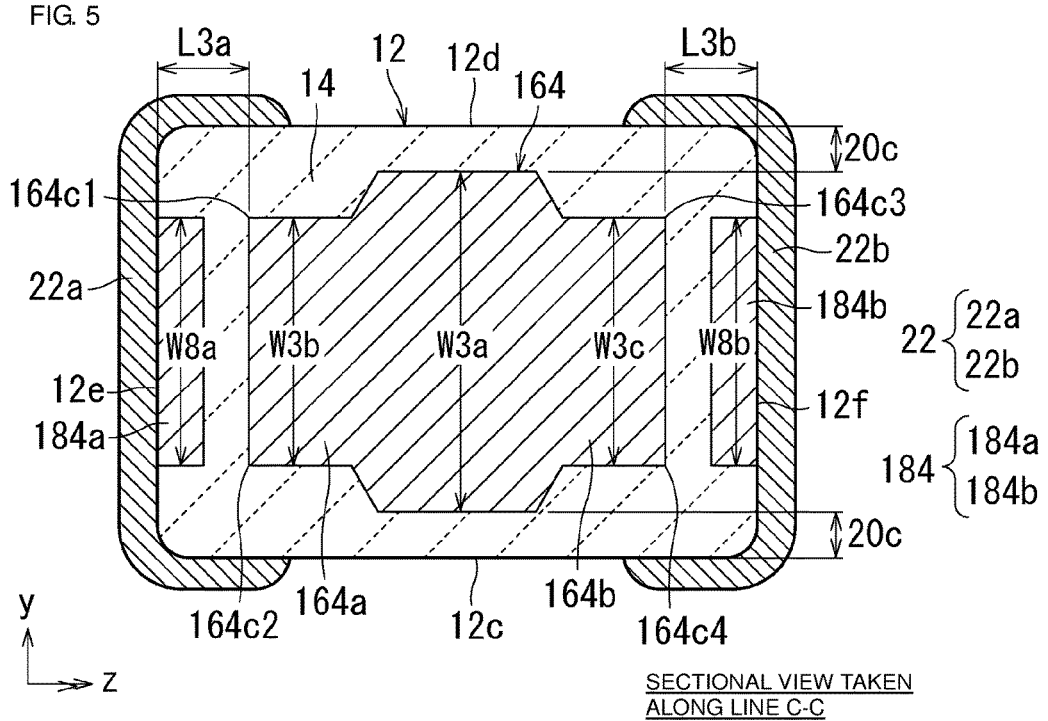
FIG. 5 is a sectional view of the multilayer ceramic capacitor according to the first preferred embodiment, taken along line C-C in FIG. 2.
Figure 6:
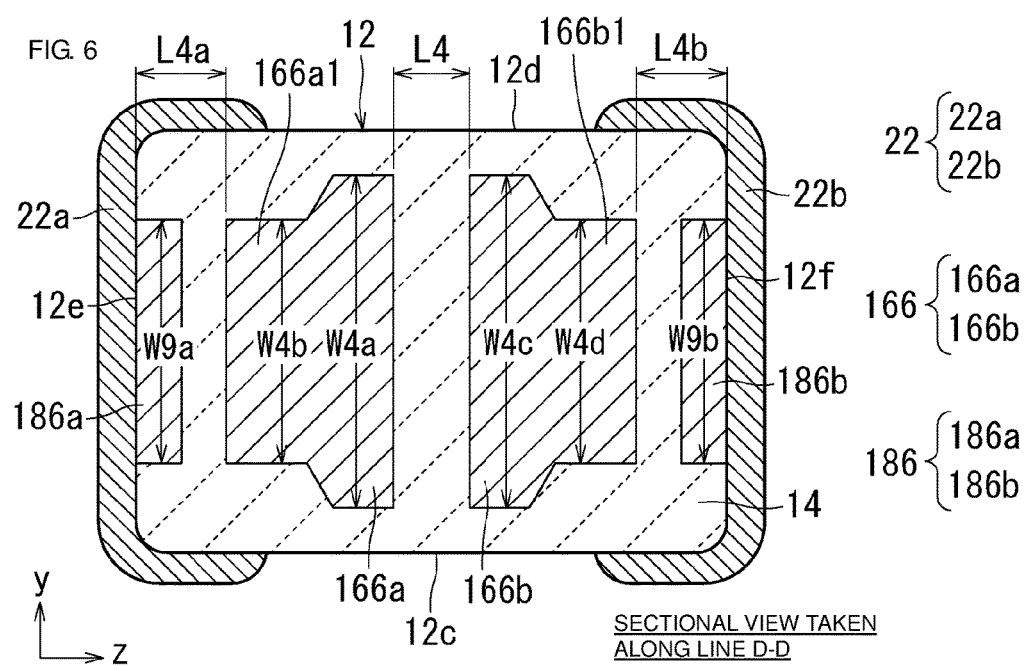
FIG. 6 is a sectional view of the multilayer ceramic capacitor according to the first preferred embodiment, taken along line D-D in FIG. 2.
Figure 7:
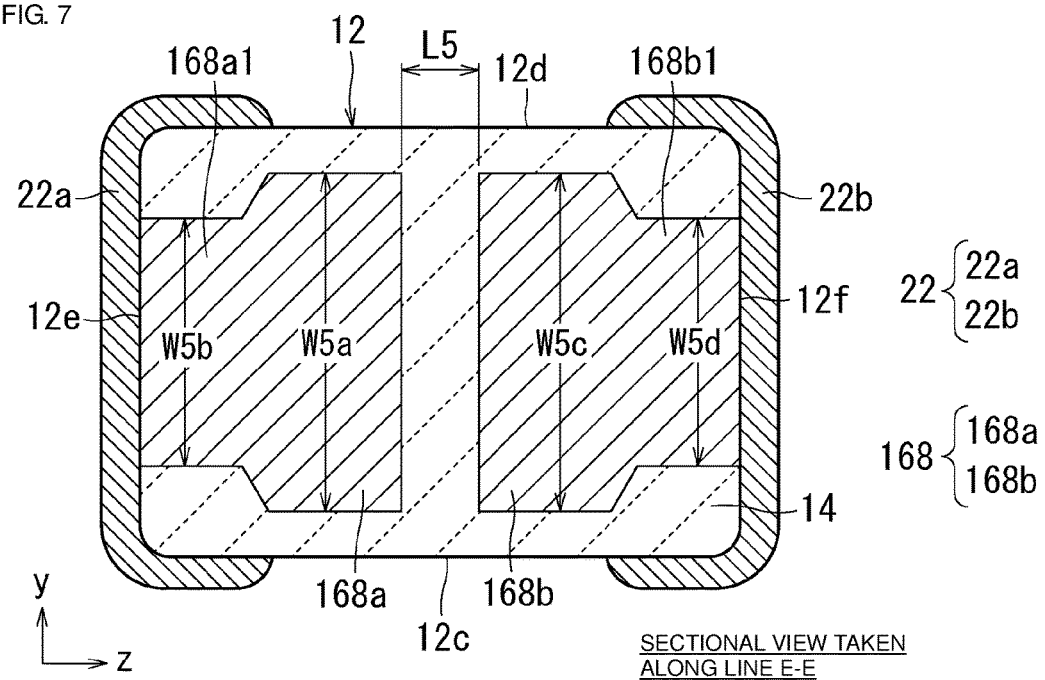
FIG. 7 is a sectional view of the multilayer ceramic capacitor according to the first preferred embodiment, taken along line E-E in FIG. 2.
Figure 8:
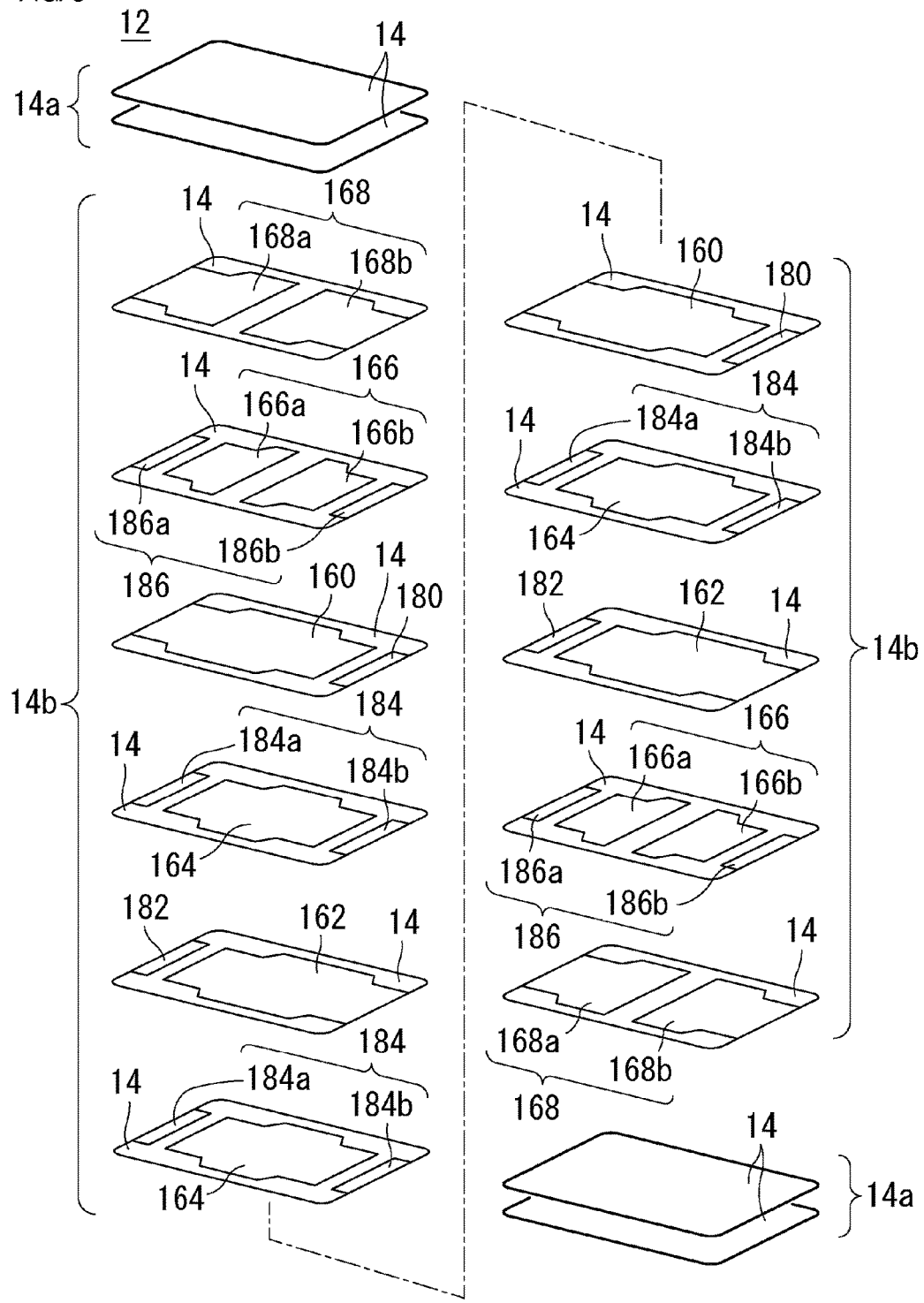
FIG. 8 is an exploded perspective view of a multilayer body illustrated in FIG. 1A.

A multilayer ceramic capacitor according to a first preferred embodiment of the present invention will be described. FIG. 1A is an external perspective view illustrating an example of the multilayer ceramic capacitor according to the first preferred embodiment of the present invention, and FIG. 1B is a front view of the multilayer ceramic capacitor illustrated in FIG. 1A. FIG. 2 is a sectional view of the multilayer ceramic capacitor according to the first preferred embodiment of the present invention, taken along line II-II in FIG. 1A. FIG. 3 is a sectional view of the multilayer ceramic capacitor according to the first preferred embodiment, taken along line A-A in FIG. 2. FIG. 4 is a sectional view of the multilayer ceramic capacitor according to the first preferred embodiment, taken along line B-B in FIG. 2. FIG. 5 is a sectional view of the multilayer ceramic capacitor according to the first preferred embodiment, taken along line C-C in FIG. 2. FIG. 6 is a sectional view of the multilayer ceramic capacitor according to the first preferred embodiment, taken along line D-D in FIG. 2. FIG. 7 is a sectional view of the multilayer ceramic capacitor according to the first preferred embodiment, taken along line E-E in FIG. 2. FIG. 8 is an exploded perspective view of a multilayer body illustrated in FIG. 1A.

As illustrated in FIG. 1A, a multilayer ceramic capacitor 10 according to the first preferred embodiment of the present invention includes a multilayer body 12.

The multilayer body 12 includes a plurality of dielectric layers 14, which are stacked on one another, a plurality of inner electrodes 16, and a plurality of auxiliary electrodes 18. The multilayer body 12 further includes a first main surface 12a, a second main surface 12b, a first side surface 12c, a second side surface 12d, a first end surface 12e, and a second end surface 12f. The first main surface 12a and the second main surface 12b face each other in a stacking direction x. The first side surface 12c and the second side surface 12d face each other in a width direction y orthogonal to the stacking direction x. The first end surface 12e and the second end surface 12f face each other in a length direction z orthogonal to the stacking direction x and the width direction y. The multilayer body 12 preferably has a substantially rectangular parallelepiped shape, for example. Preferably, the multilayer body 12 is rounded at corner portions and ridge portions thereof. The main surfaces 12a and 12b, the side surfaces 12c and 12d, and the end surfaces 12e and 12f of the multilayer body 12 may have irregularities in its entirety or a portion thereof. Each corner portion is a portion where three adjacent surfaces of the multilayer body 12 intersect, and each ridge portion is a portion where two adjacent surfaces of the multilayer body 12 intersect.

The dielectric layers 14 include outer layer portions 14a and an inner layer portion 14b. The outer layer portions 14a are located near the first main surface 12a and the second main surface 12b of the multilayer body 12. The outer layer portions 14a include the dielectric layer 14 located between the first main surface 12a and the inner electrode 16 closest to the first main surface 12a, and the dielectric layer 14 located between the second main surface 12b and the inner electrode 16 closest to the second main surface 12b. The area sandwiched between the outer layer portions 14a corresponds to the inner layer portion 14b.

The dielectric layers 14 may be each made of a dielectric material. The dielectric material may be, for example, a dielectric ceramic containing $BaTiO_3$, $CaTiO_3$, $SrTiO_3$, $CaZrO_3$, or any other component. If each of the dielectric layers 14 is made of a material containing the dielectric material described above as a main component, the material may further contain a secondary component such as a Mn compound, an Fe compound, a Cr compound, a Co compound, a Ni compound, or a rare-earth compound, where the content of the secondary component is lower than that of the main component, depending on the desired characteristics of the multilayer ceramic capacitor 10.

After firing, the dielectric layers 14 preferably have a thickness greater than or equal to about 0.5 μm and less than or equal to about 100 μm, for example.

The inner electrodes 16 include first inner electrodes 160, second inner electrodes 162, third inner electrodes 164, fourth inner electrodes 166, and fifth inner electrodes 168.

Each of the first inner electrodes 160, each of the second inner electrodes 162, each of the third inner electrodes 164, each of the fourth inner electrodes 166, and each of the fifth inner electrodes 168 are disposed on different planes.

Each of the first inner electrodes 160 has a first end extending to the first end surface 12e. Each of the first inner electrodes 160 has a second end not extending to the first end surface 12e or to the second end surface 12f, and a gap area L1 is defined between the second end of the first inner electrode 160 and the second end surface 12f.

Each of the first inner electrodes 160 includes a first end portion 160a and a second end portion 160b that are narrower than a center portion thereof in the length direction z. That is, a length W1b of the first end portion 160a of the first inner electrode 160 in the width direction y between the first side surface 12c and the second side surface 12d and a length W1c of the second end portion 160b of the first inner electrode 160 in the width direction y between the first side surface 12c and the second side surface 12d are each smaller than a length W1a of the center portion of the first inner electrode 160 in the length direction z in the width direction y between the first side surface 12c and the second side surface 12d.

The first end portion 160a at the first end of the first inner electrode 160 extends to the first end surface 12e. In the second end portion 160b at the second end of the first inner electrode 160, an inner electrode corner portion 160c1 at a corner of the second end portion 160b is located farther from the first side surface 12c of the multilayer body 12 than the center portion of the first inner electrode 160 in the length direction z, and an inner electrode corner portion 160c2 at the other corner of the second end portion 160b is located farther from the second side surface 12d of the multilayer body 12 than the center portion of the first inner electrode 160 in the length direction z.

As illustrated in FIG. 3, portions where a wide portion in the center portion of the first inner electrode 160 in the length direction z is connected to the first end portion 160a and the second end portion 160b, which are narrower, have angled corners. Alternatively, the portions may have right-angle corners.

Each of the second inner electrodes 162 has a first end extending to the second end surface 12f. Each of the second inner electrodes 162 has a second end not extending to the first end surface 12e or to the second end surface 12f, and a gap area L2 is defined between the second end of the second inner electrode 162 and the first end surface 12e.

Each of the second inner electrodes 162 includes a third end portion 162a and a fourth end portion 162b that are narrower than a center portion thereof in the length direction z. That is, a length W2b of the third end portion 162a of the second inner electrode 162 in the width direction y between the first side surface 12c and the second side surface 12d and a length W2c of the fourth end portion 162b of the second inner electrode 162 in the width direction y between the first side surface 12c and the second side surface 12d are each smaller than a length W2a of the center portion of the second inner electrode 162 in the length direction z in the width direction y between the first side surface 12c and the second side surface 12d.

The third end portion 162a at the first end of the second inner electrode 162 extends to the second end surface 12f. In the fourth end portion 162b at the second end of the second inner electrode 162, an inner electrode corner portion 162c1 at a corner of the fourth end portion 162b is located farther from the first side surface 12c of the multilayer body 12 than the center portion of the second inner electrode 162 in the length direction z, and an inner electrode corner portion 162c2 at the other corner of the fourth end portion 162b is located farther from the second side surface 12d of the multilayer body 12 than the center portion of the second inner electrode 162 in the length direction z.

As illustrated in FIG. 4, portions where a wide portion in the center portion of the second inner electrode 162 in the length direction z is connected to the third end portion 162a and the fourth end portion 162b, which are narrower, have angled corners. Alternatively, the portions may have right-angle corners.

The third inner electrodes 164 are arranged alternately with the first inner electrodes 160 and the second inner electrodes 162. Each of the third inner electrodes 164 has a first end not extending to the first end surface 12e, and a gap area L3a is defined between the first end of the third inner electrode 164 and the first end surface 12e. Each of the third inner electrodes 164 has a second end not extending to the second end surface 12f, and a gap area L3b is defined between the second end of the third inner electrode 164 and the second end surface 12f.

Each of the third inner electrodes 164 includes a fifth end portion 164a and a sixth end portion 164b that are narrower than a center portion thereof in the length direction z. That is, a length W3b of the fifth end portion 164a of the third inner electrode 164 in the width direction y between the first side surface 12c and the second side surface 12d and a length W3c of the sixth end portion 164b of the third inner electrode 164 in the width direction y between the first side surface 12c and the second side surface 12d are each smaller than a length W3a of the center portion of the third inner electrode 164 in the length direction z in the width direction y between the first side surface 12c and the second side surface 12d.

In the fifth end portion 164a at the first end of the third inner electrode 164, an inner electrode corner portion 164c1 at a corner of the fifth end portion 164a is located farther from the first side surface 12c of the multilayer body 12 than the center portion of the third inner electrode 164 in the length direction z, and an inner electrode corner portion 164c2 at the other corner of the fifth end portion 164a is located farther from the second side surface 12d of the multilayer body 12 than the center portion of the third inner electrode 164 in the length direction z. Also, in the sixth end portion 164b at the second end of the third inner electrode 164, an inner electrode corner portion 164c3 at a corner of the sixth end portion 164b is located farther from the first side surface 12c of the multilayer body 12 than the center portion of the third inner electrode 164 in the length direction z, and an inner electrode corner portion 164c4 at the other corner of the sixth end portion 164b is located farther from the second side surface 12d of the multilayer body 12 than the center portion of the third inner electrode 164 in the length direction z.

As illustrated in FIG. 5, portions where a wide portion in the center portion of the third inner electrode 164 in the length direction z is connected to the fifth end portion 164a and the sixth end portion 164b, which are narrower, have angled corners. Alternatively, the portions may have right-angle corners.

The fourth inner electrodes 166 include a fourth inner electrode 166 located between the first inner electrode 160 or the second inner electrode 162 closest to the first main surface 12a and the fifth inner electrode 168 on the first main surface 12a side, and a fourth inner electrode 166 located between the first inner electrode 160 or the second inner electrode 162 closest to the second main surface 12b and the fifth inner electrode 168 on the second main surface 12b side.

Each of the fourth inner electrodes 166 is separated in a center portion of the multilayer body 12 in the length direction z into portions with a gap area L4 therebetween. Thus, each of the fourth inner electrodes 166 includes a fourth inner electrode portion 166a located near the first end surface 12e and a fourth inner electrode portion 166b located near the second end surface 12f.

A gap area L4a is defined between a first end of the fourth inner electrode portion 166a and the first end surface 12e of the multilayer body 12, and a gap area L4b is defined between a first end of the fourth inner electrode portion 166b and the second end surface 12f of the multilayer body 112.

A second end of the fourth inner electrode portion 166a (the end of the fourth inner electrode portion 166a farther from the first end surface 12e) and a second end of the fourth inner electrode portion 166b (the end of the fourth inner electrode portion 166b farther from the second end surface 12f) are disposed with the gap area L4 interposed therebetween.

Accordingly, none of the first and second ends of the fourth inner electrode portion 166a extends to the first end surface 12e or to the second end surface 12f, and none of the first and second ends of the fourth inner electrode portion 166b extends to the first end surface 12e or to the second end surface 12f.

While the fourth inner electrode portion 166a may have any shape, as illustrated in FIG. 6, the fourth inner electrode portion 166a includes at the first end thereof a seventh end portion 166a1 narrower than the second end thereof. Likewise, the fourth inner electrode portion 166b includes at the first end thereof an eighth end portion 166b1 narrower than the second end thereof. That is, a length W4b of the seventh end portion 166a1 of the fourth inner electrode portion 166a in the width direction y between the first side surface 12c and the second side surface 12d is smaller than a length W4a of the second end of the fourth inner electrode portion 166a in the width direction y between the first side surface 12c and the second side surface 12d, and a length W4d of the eighth end portion 166b1 of the fourth inner electrode portion 166b in the width direction y between the first side surface 12c and the second side surface 12d is smaller than a length W4c of the second end of the fourth inner electrode portion 166b in the width direction y between the first side surface 12c and the second side surface 12d.

Further, a portion where a wide portion at the second end of the fourth inner electrode portion 166a is connected to the seventh end portion 166a1, which is narrower, has angled corners. Alternatively, the portion may have right-angle corners. Likewise, a portion where a wide portion at the second end of the fourth inner electrode portion 166b is connected to the eighth end portion 166b1, which is narrower, has angled corners. Alternatively, the portion may have right-angle corners.

The fifth inner electrodes 168 include a fifth inner electrode 168 located closest to the first main surface 12a, and a fifth inner electrode 168 located closest to the second main surface 12b of the multilayer body 12.

Each of the fifth inner electrodes 168 is separated in the center portion of the multilayer body 12 in the length direction z into portions with a gap area L5 therebetween. Thus, each of the fifth inner electrodes 168 includes a fifth inner electrode portion 168a located near the first end surface 12e and a fifth inner electrode portion 168b located near the second end surface 12f.

A first end of the fifth inner electrode portion 168a extends to the first end surface 12e, and a first end of the fifth inner electrode portion 168b extends to the second end surface 12f.

A second end of the fifth inner electrode portion 168a (the end of the fifth inner electrode portion 168a farther from the first end surface 12e) and a second end of the fifth inner electrode portion 168b (the end of the fifth inner electrode portion 168b farther from the second end surface 12f) are disposed with the gap area L5 interposed therebetween.

While the fifth inner electrode portion 168a may have any shape, as illustrated in FIG. 7, the fifth inner electrode portion 168a includes at the first end thereof a ninth end portion 168a1 narrower than the second end thereof. Likewise, the fifth inner electrode portion 168b includes at the first end thereof a tenth end portion 168b1 narrower than the second end thereof. That is, a length W5b of the ninth end portion 168a1 of the fifth inner electrode portion 168a in the width direction y between the first side surface 12c and the second side surface 12d is smaller than a length W5a of the second end of the fifth inner electrode portion 168a in the width direction y between the first side surface 12c and the second side surface 12d, and a length W5d of the tenth end portion 168b1 of the fifth inner electrode portion 168b in the width direction y between the first side surface 12c and the second side surface 12d is smaller than a length W5c of the second end of the fifth inner electrode portion 168b in the width direction y between the first side surface 12c and the second side surface 12d.

The ninth end portion 168a1 at the first end of the fifth inner electrode portion 168a extends to the first end surface 12e, and the tenth end portion 168b1 at the first end of the fifth inner electrode portion 168b extends to the second end surface 12f.

Further, a portion where a wide portion at the second end of the fifth inner electrode portion 168a is connected to the ninth end portion 168a1, which is narrower, has angled corners. Alternatively, the portion may have right-angle corners. Likewise, a portion where a wide portion at the second end of the fifth inner electrode portion 168b is connected to the tenth end portion 168b1, which is narrower, has angled corners. Alternatively, the portion may have right-angle corners.

The multilayer body 12 includes first opposing-electrode portions 20a. In the first opposing-electrode portions 20a, the first inner electrodes 160 and the third inner electrodes 164 face each other and the second inner electrodes 162 and the third inner electrodes 164 face each other in the inner layer portion 14b of the dielectric layers 14. The multilayer body 12 also includes second opposing-electrode portions 20b. In the second opposing-electrode portions 20b, the fourth inner electrodes 166 and the fifth inner electrodes 168 face each other in the inner layer portion 14b of the dielectric layers 14. The multilayer body 12 further includes side portions (hereinafter referred to as "W gaps") 20c. The side portions 20c are defined between first ends of the first opposing-electrode portions 20a and the second opposing-electrode portions 20b in the width direction y and the first side surface 12c and between second ends of the first opposing-electrode portions 20a and the second opposing-electrode portions 20b in the width direction y and the second side surface 12d.

When viewed in the stacking direction x, the second end portions 160b of the first inner electrodes 160 extend so as to be closer to the second end surface 12f than the sixth end portions 164b of the third inner electrodes 164, and the fourth end portions 162b of the second inner electrodes 162 extend so as to be closer to the first end surface 12e than the fifth end portions 164a of the third inner electrodes 164.

The structure described above achieves the following advantages.

In a typical series capacitor, voltage is more likely to be applied to an effective portion having a smaller effective area.

When the position of the second end portion of the first inner electrode coincides with the position of the sixth end portion of the third inner electrode when viewed in the stacking direction x (in FIG. 9A), a displacement of the first inner electrode may cause a difference between the effective area of the first inner electrode and the third inner electrode and the effective area of the second inner electrode and the third inner electrode. In contrast, in the structure according to this preferred embodiment in which the second end portion 160b of the first inner electrode 160 extends so as to be closer to the second end surface 12f than the sixth end portion 164b of the third inner electrode 164, a displacement of the first inner electrode 160 may be less likely to cause a difference between the effective area of the first inner electrode 160 and the third inner electrode 164 and the effective area of the second inner electrode 162 and the third inner electrode 164 (in FIG. 9B).

Also, when the position of the second end portion of the second inner electrode coincides with the position of the sixth end portion of the third inner electrode when viewed in the stacking direction x (in FIG. 9A), a displacement of the second inner electrode may cause a difference between the effective area of the first inner electrode and the third inner electrode and the effective area of the second inner electrode and the third inner electrode. In contrast, in the structure according to this preferred embodiment in which the fourth end portion 162b of the second inner electrode 162 extends so as to be closer to the first end surface 12e than the fifth end portion 164a of the third inner electrode 164, a displacement of the second inner electrode 162 may be less likely to cause a difference between the effective area of the first inner electrode 160 and the third inner electrode 164 and the effective area of the second inner electrode 162 and the third inner electrode 164 (in FIG. 9C).

Figures 9A, 9B, 9C:
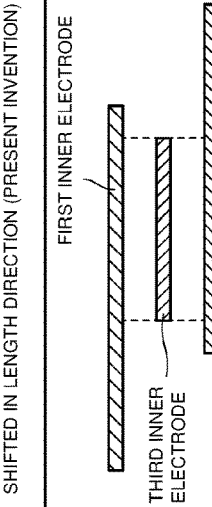
FIGS. 9A-9C are diagrams illustrating the advantages of a preferred embodiment of the present invention in relation to a displacement of a first inner electrode or a second inner electrode.

Accordingly, as illustrated in FIGS. 9A-9C, the second end portions 160b of the first inner electrodes 160 extend so as to be closer to the second end surface 12f than the sixth end portions 164b of the third inner electrodes 164 and the fourth end portions 162b of the second inner electrodes 162 extend so as to be closer to the first end surface 12e than the fifth end portions 164a of the third inner electrodes 164. This structure may be less likely to cause a change in upper and lower effective areas between the first inner electrodes 160 and the third inner electrodes 164 or between the second inner electrodes 162 and the third inner electrodes 164 (i.e., less likely to cause a change in the areas of the first opposing-electrode portions 20a) even if a displacement occurs between stacked layers. As a result, voltage deviation caused by a displacement between stacked layers is less likely to occur.

The inner electrodes 16, that is, the first inner electrodes 160, the second inner electrodes 162, the third inner electrodes 164, the fourth inner electrodes 166, and the fifth inner electrodes 168, may be each made of an appropriate conductive material, for example, a metal such as Ni, Cu, Ag, Pd, or Au or an alloy containing at least one of these metals, such as a Ag—Pd alloy.

Further, each of the inner electrodes 16, that is, the first inner electrodes 160, the second inner electrodes 162, the third inner electrodes 164, the fourth inner electrodes 166, and the fifth inner electrodes 168, preferably has a thickness greater than or equal to about 0.2 μm and less than or equal to about 2.0 μm, for example.

The plurality of auxiliary electrodes 18 of the multilayer body 12 include first auxiliary electrodes 180, second auxiliary electrodes 182, third auxiliary electrodes 184, and fourth auxiliary electrodes 186.

The first auxiliary electrodes 180 are disposed on the same planes as the first inner electrodes 160 and are each spaced apart from the corresponding one of the first inner electrodes 160. Thus, each first auxiliary electrode 180 is arranged in the gap area L1. The first auxiliary electrode 180 extends to the second end surface 12f. The first auxiliary electrode 180 may have any shape. Preferably, the first auxiliary electrode 180 has a substantially rectangular shape.

The second auxiliary electrodes 182 are disposed on the same planes as the second inner electrodes 162 and are each spaced apart from the corresponding one of the second inner electrodes 162. Thus, each second auxiliary electrode 182 is arranged in the gap area L2. The second auxiliary electrode 182 extends to the first end surface 12e. The second auxiliary electrode 182 may have any shape. Preferably, the second auxiliary electrode 182 has a substantially rectangular shape.

The third auxiliary electrodes 184 are disposed on the same planes as the third inner electrodes 164 and are each separated in the length direction z of the multilayer body 12 into portions with the corresponding one of the third inner electrodes 164 therebetween. Each third auxiliary electrode 184 includes a third auxiliary electrode portion 184a located near the first end surface 12e and a third auxiliary electrode portion 184b located near the second end surface 12f. The third auxiliary electrode portion 184a is arranged in the gap area L3a, and the third auxiliary electrode portion 184b is arranged in the gap area L3b. The third auxiliary electrode portion 184a extends to the first end surface 12e, and the third auxiliary electrode portion 184b extends to the second end surface 12f. The third auxiliary electrode portion 184a and the third auxiliary electrode portion 184b may have any shape. Preferably, the third auxiliary electrode portion 184a and the third auxiliary electrode portion 184b have a substantially rectangular shape.

The fourth auxiliary electrodes 186 are disposed on the same planes as the fourth inner electrodes 166 and are each separated in the length direction z of the multilayer body 12 into portions with the corresponding one of the fourth inner electrodes 166 therebetween. Each fourth auxiliary electrode 186 includes a fourth auxiliary electrode portion 186a located near the first end surface 12e and a fourth auxiliary electrode portion 186b located near the second end surface 12f. The fourth auxiliary electrode portion 186a is arranged in the gap area L4a, and the fourth auxiliary electrode portion 186b is arranged in the gap area L4b. The fourth auxiliary electrode portion 186a extends to the first end surface 12e, and the fourth auxiliary electrode portion 186b extends to the second end surface 12f. The fourth auxiliary electrode portion 186a and the fourth auxiliary electrode portion 186b may have any shape. Preferably, the fourth auxiliary electrode portion 186a and the fourth auxiliary electrode portion 186b have a substantially rectangular shape.

The length W1b of the first end portion 160a of the first inner electrode 160 in the width direction y between the first side surface 12c and the second side surface 12d, the length W1c of the second end portion 160b of the first inner electrode 160 in the width direction y between the first side surface 12c and the second side surface 12d, a length W6 of the first auxiliary electrode 180 in the width direction y between the first side surface 12c and the second side surface 12d, the length W2b of the third end portion 162a of the second inner electrode 162 in the width direction y between the first side surface 12c and the second side surface 12d, the length W2c of the fourth end portion 162b of the second inner electrode 162 in the width direction y between the first side surface 12c and the second side surface 12d, a length W7 of the second auxiliary electrode 182 in the width direction y between the first side surface 12c and the second side surface 12d, the length W3b of the fifth end portion 164a of the third inner electrode 164 in the width direction y between the first side surface 12c and the second side surface 12d, the length W3c of the sixth end portion 164b of the third inner electrode 164 in the width direction y between the first side surface 12c and the second side surface 12d, a length W8a of the third auxiliary electrode portion 184a in the width direction y between the first side surface 12c and the second side surface 12d, and a length W8b of the third auxiliary electrode portion 184b in the width direction y between the first side surface 12c and the second side surface 12d are identical or substantially identical.

The structure described above ensures that the multilayer ceramic capacitor 10 achieves the desired capacitance.

The auxiliary electrodes 18, that is, the first auxiliary electrodes 180, the second auxiliary electrodes 182, the third auxiliary electrodes 184, and the fourth auxiliary electrodes 186, may be each made of an appropriate conductive material, for example, a metal such as Ni, Cu, Ag, Pd, or Au or an alloy containing at least one of these metals, such as a Ag—Pd alloy.

Further, each of the auxiliary electrodes 18, that is, the first auxiliary electrodes 180, the second auxiliary electrodes 182, the third auxiliary electrodes 184, and the fourth auxiliary electrodes 186, preferably has a thickness greater than or equal to about 0.2 µm and less than or equal to about 2.0 µm, for example.

The multilayer body 12 includes outer electrodes 22 on the first end surface 12e and the second end surface 12f. The outer electrodes 22 include a first outer electrode 22a and a second outer electrode 22b.

The first outer electrode 22a is defined on the first end surface 12e of the multilayer body 12. The first outer electrode 22a covers the first end surface 12e of the multilayer body 12, extend from the first end surface 12e, and cover portion of the first main surface 12a, the second main surface 12b, the first side surface 12c, and the second side surface 12d. In this case, the first outer electrode 22a is electrically connected to the first end portions 160a of the first inner electrodes 160 and the ninth end portions 168a1 of the fifth inner electrode portions 168a. The first outer electrode 22a may be defined only on the first end surface 12e of the multilayer body 12.

The second outer electrode 22b is defined on the second end surface 12f of the multilayer body 12. The second outer electrode 22b covers the second end surface 12f of the multilayer body 12, extend from the second end surface 12f, and cover portion of the first main surface 12a, the second main surface 12b, the first side surface 12c, and the second side surface 12d. In this case, the second outer electrode 22b is electrically connected to the third end portions 162a of the second inner electrodes 162 and the tenth end portions 168b1 of the fifth inner electrode portions 168b. The second outer electrode 22b may be defined only on the second end surface 12f of the multilayer body 12.

In the first opposing-electrode portions 20a of the multilayer body 12, the first inner electrodes 160 and the third inner electrodes 164 face each other with the dielectric layers 14 interposed therebetween to provide capacitance accordingly. In the first opposing-electrode portions 20a, also, the second inner electrodes 162 and the third inner electrodes 164 face each other with the dielectric layers 14 interposed therebetween to provide capacitance accordingly.

In the second opposing-electrode portions 20b of the multilayer body 12, furthermore, the fourth inner electrodes 166 and the fifth inner electrodes 168 face each other with the dielectric layers 14 interposed therebetween to provide capacitance accordingly.

Each of the first outer electrode 22a and the second outer electrode 22b includes, in sequence from the multilayer body 12, an underlying electrode layer and a plating layer on a surface of the underlying electrode layer.

The underlying electrode layer includes at least one selected from, for example, a baked layer, a resin layer, and a thin-film layer. An underlying electrode layer formed of a baked layer is described herein.

The baked layer contains glass and metal. Glass as a material of the baked layer includes at least one selected from, for example, B, Si, Ba, Mg, Al, and Li. Metal as a material of the baked layer includes at least one selected from, for example, Cu, Ni, Ag, Pd, a Ag—Pd alloy, and Au. The baked layer may include a plurality of layers. The baked layer is formed preferably by applying a conductive paste containing glass and metal to the multilayer body 12 and baking the conductive paste. The baked layer may be fired simultaneously with the dielectric layers 14 and the inner electrodes 16 or may be baked after the dielectric layers 14 and the inner electrodes 16 are fired. The thickest portion of the baked layer preferably has a thickness greater than or equal to about 10 µm and less than or equal to about 50 µm, for example.

A resin layer containing conductive particles and thermosetting resin may be formed on a surface of the baked layer. The resin layer may be formed directly on the multilayer body 12 without the formation of a baked layer. The resin layer may include a plurality of layers. The thickness portion of the resin layer preferably has a thickness greater than or equal to about 10 µm and less than or equal to about 150 µm, for example.

The thin-film layer is formed using a thin-film forming process such as sputtering or vapor deposition. The thin-film layer is a layer of about 1 µm or less on which metal particles are deposited, for example.

The plating layer may be made of at least one metal selected from, for example, Cu, Ni, Sn, Ag, Pd, a Ag—Pd alloy, Au, Bi, and Zn or an alloy containing the metal.

The plating layer may be formed of a plurality of layers. Preferably, the plating layer has a two-layer structure including a first plating layer on a surface of the baked layer and a second plating layer on a surface of the first plating layer.

The first plating layer preferably includes Ni. The first plating layer composed of Ni is used to prevent the underlying electrode layer from being corroded by solder during the mounting of the multilayer ceramic capacitor 10. If the inner electrodes 16 contain Ni, the first plating layer preferably includes Cu, which has high bondability with Ni.

The second plating layer preferably includes Sn or Au. The second plating layer composed of Sn or Au is used for improving the wettability of solder during the mounting of the multilayer ceramic capacitor 10 to facilitate mounting. The second plating layer is formed, if necessary. The outer electrodes 22 may be formed directly on the multilayer body 12 and may include a plating layer directly connected to the inner electrode 16, that is, by the first plating layer. A catalyst may be used on the multilayer body 12 during pretreatment.

The second plating layer may be used as the outermost layer of the plating layer or another plating layer may be formed on a surface of the second plating layer.

Each plating layer preferably has a thickness greater than or equal to about 1 µm and less than or equal to about 15 µm, for example.

The dimension of the multilayer ceramic capacitor 10 including the multilayer body 12, the first outer electrode 22a, and the second outer electrode 22b in the length direction z is denoted by L dimension, the dimension of the multilayer ceramic capacitor 10 including the multilayer body 12, the first outer electrode 22a, and the second outer electrode 22b in the stacking direction x is denoted by T dimension, and the dimension of the multilayer ceramic capacitor 10 including the multilayer body 12, the first outer electrode 22a, and the second outer electrode 22b in the width direction y is denoted by W dimension.

The multilayer ceramic capacitor 10 has the following dimensions: greater than or equal to about 0.6 mm and less than or equal to about 5.7 mm for the L dimension in the length direction z; greater than or equal to about 0.2 mm and less than or equal to about 2.5 mm for the T dimension in the stacking direction x; and greater than or equal to about 0.3 mm and less than or equal to about 5.0 mm for the W dimension in the width direction y, for example. The L dimension in the length direction z is not necessarily longer than the W dimension in the width direction y. The dimensions of the multilayer ceramic capacitor 10 can be measured with a microscope.

A preferred embodiment of a method for manufacturing a multilayer ceramic capacitor having the structure described above will now be described, taking as an example the multilayer ceramic capacitor 10 according to the first preferred embodiment of the present invention.

First, a dielectric sheet, an inner electrode conductive paste for forming the inner electrodes 16, and an outer electrode conductive paste for forming the outer electrodes 22 are prepared. The dielectric sheet, the inner electrode conductive paste, and the outer electrode conductive paste include an organic binder and solvent that may be a known organic binder and organic solvent.

Then, the inner electrode conductive paste is applied to the dielectric sheet in a predetermined pattern by using printing technology such as screen printing, gravure printing, or inkjet printing to form the respective patterns of the first inner electrodes 160, the second inner electrodes 162, the third inner electrodes 164, the fourth inner electrodes 166, and the fifth inner electrodes 168. On the same plane as the dielectric sheet on which the first inner electrode pattern is printed, a first auxiliary electrode pattern spaced apart from the first inner electrode pattern is printed. Likewise, a second auxiliary electrode pattern spaced apart from the second inner electrode pattern is printed on the same plane as the dielectric sheet on which the second inner electrode pattern is printed, and a third auxiliary electrode pattern and another third auxiliary electrode pattern are printed so that the third inner electrode pattern is interposed therebetween on the same plane as the dielectric sheet on which the third inner electrode pattern is printed. Also, on the same plane as the dielectric sheet on which the fourth inner electrode pattern is printed, a fourth auxiliary electrode pattern and another fourth auxiliary electrode pattern are printed so that a fourth inner electrode pattern and another fourth inner electrode pattern are interposed therebetween.

Then, a predetermined number of outer layer dielectric sheets on which no inner electrode pattern is printed are stacked, and on top of them, one or more dielectric sheets on which the fifth inner electrode pattern is printed are stacked. On top of them, one or more dielectric sheets on which the fourth inner electrode pattern and the fourth auxiliary electrode pattern are printed are stacked, and on top of them, dielectric sheets on which the first to third inner electrode patterns and the first to third auxiliary electrode patterns are printed are stacked. On top of them, one or more dielectric sheets on which the fourth inner electrode pattern and the fourth auxiliary electrode pattern are printed are stacked, and on top of them, one or more dielectric sheets on which the fifth inner electrode pattern is printed are stacked. On top of them, finally, a predetermined number of outer layer dielectric sheets on which no inner electrode pattern is printed are stacked. Therefore, a multilayer body sheet is produced.

The produced multilayer body sheet is then pressed by isostatic pressing or other suitable process. As a result, a multilayer block is produced.

Thereafter, the multilayer block is cut into raw multilayer chips having a predetermined shape and size. The multilayer chips may be subjected to barrel polishing or the like to obtain rounded corner portions and ridge portions.

Then, the multilayer chips are fired to form multilayer bodies. The firing temperature, which depends on the material of the dielectric body and the inner electrodes, is preferably greater than or equal to about 900° C. and less than or equal to about 1300° C., for example.

At this time, the first end portions 160a of the first inner electrodes 160 and the ninth end portions 168a1 of the fifth inner electrode portions 168a are exposed on the first end surface 12e of the multilayer body 12. The underlying electrode layer of the first outer electrode 22a covers the first end portions 160a of the first inner electrodes 160 and the ninth end portions 168a1 of the fifth inner electrode portions 168a, which are exposed on the first end surface 12e of the multilayer body 12. Further, the third end portions 162a of the second inner electrodes 162 and the tenth end portions 168b1 of the fifth inner electrode portions 168b are exposed on the second end surface 12f of the multilayer body 12. The underlying electrode layer of the second outer electrode 22b covers the third end portions 162a of the second inner electrodes 162 and the tenth end portions 168b1 of the fifth inner electrode portions 168b, which are exposed on the second end surface 12f of the multilayer body 12.

To form the underlying electrode layer of the first outer electrode 22a, for example, the outer electrode conductive paste is applied to the exposed portions of the first end portions 160a of the first inner electrodes 160 and the ninth end portions 168a1 of the fifth inner electrode portions 168a, which are exposed on the first end surface 12e of the multilayer body 12, and is baked. Likewise, to form the underlying electrode layer of the second outer electrode 22b, for example, the outer electrode conductive paste is applied to the exposed portions of the third end portions 162a of the second inner electrodes 162 and the tenth end portions 168b1 of the fifth inner electrode portions 168b, which are exposed on the second end surface 12f of the multilayer body 12, and is baked. The baking temperature is preferably greater than or equal to about 700° C. and less than or equal to about 900° C., for example. One or more plating layers are formed on a surface of the underlying electrode layer, as necessary, to form the outer electrode 22.

To form the underlying electrode layer of the first outer electrode 22a, for example, plating may be performed on the exposed portions of the first end portions 160a of the first inner electrodes 160 and the ninth end portions 168a1 of the fifth inner electrode portions 168a, which are exposed on the first end surface 12e of the multilayer body 12. Likewise, to form the underlying electrode layer of the second outer electrode 22b, for example, plating may be performed on the exposed portions of the third end portions 162a of the second inner electrodes 162 and the tenth end portions 168b1 of the fifth inner electrode portions 168b, which are exposed on the second end surface 12f of the multilayer body 12. Either electrolytic plating or electroless plating may be used in the plating process. Electroless plating requires a pretreatment using a catalyst or the like to improve the plating deposition rate, which may disadvantageously result in increased complexity of steps. Accordingly, preferably, electrolytic plating is typically used. The barrel plating method is preferably used as a plating method. In order to form a surface conductor, a surface conductor pattern may be printed in advance on a surface of the outermost dielectric sheet and may be fired simultaneously with the multilayer body 12, or a surface conductor may be printed on a main surface of the fired multilayer body 12 and may then be baked. One or more plating layers are formed on a surface of the underlying electrode layer, as necessary, to form the outer electrodes 22.

The multilayer ceramic capacitor 10 illustrated in FIG. 1 is manufactured preferably in the way described above, for example.

In the multilayer ceramic capacitor 10 illustrated in FIG. 1, each of the first inner electrodes 160 includes the first end portion 160a and the second end portion 160b, which are narrower than the center portion. In the second end portion 160b at the second end of the first inner electrode 160, the inner electrode corner portion 160c1 at a corner of second end portion 160b is located farther from the first side surface 12c of the multilayer body 12 than the center portion of the first inner electrode 160, and the inner electrode corner portion 160c2 at the other corner of the second end portion 160b is also located farther from the second side surface 12d of the multilayer body 12 than the center portion of the first inner electrode 160. This structure enables the inner electrode corner portions 160c1 and 160c2, which are points where the electric field concentrates between the first inner electrode 160 and the outer electrodes 22 formed on the first side surface 12c and the second side surface 12d, to be kept away from the outer electrodes 22 within the side portions 20c of the multilayer body 12, and as a result less voltage is applied to the side portions 20c of the multilayer body 12. In addition, the first end portion 160a of the first inner electrode 160, which is narrow, can increase the length of the transport path of moisture that seeps in between the outer electrodes 22 and the multilayer body 12.

In the multilayer ceramic capacitor 10 illustrated in FIG. 1, furthermore, each of the second inner electrodes 162 includes the third end portion 162a and the fourth end portion 162b, which are narrower than the center portion. In the fourth end portion 162b at the second end of the second inner electrode 162, the inner electrode corner portion 162c1 at a corner of the fourth end portion 162b is located farther from the first side surface 12c of the multilayer body 12 than the center portion of the second inner electrode 162, and the inner electrode corner portion 162c2 at the other corner of the fourth end portion 162b is also located farther from the second side surface 12d of the multilayer body 12 than the center portion of the second inner electrode 162. This structure enables the inner electrode corner portions 162c1 and 162c2, which are points where the electric field concentrates between the second inner electrode 162 and the outer electrodes 22 on the first side surface 12c and the second side surface 12d, to be kept away from the outer electrodes 22 within the side portions 20c of the multilayer body 12, and as a result less voltage is applied to the side portions 20c of the multilayer body 12. In addition, the third end portion 162a of the second inner electrode 162, which is narrow, increases the length of the transport path of moisture that seeps in between the outer electrodes 22 and the multilayer body 12.

In the multilayer ceramic capacitor 10 illustrated in FIG. 1, moreover, the third inner electrodes 164 are arranged alternately with the first inner electrodes 160 and the second inner electrodes 162. This structure suppresses or prevents an increase in electric field concentration at electrode end portions (the second end portions 160b) which may occur when the element thickness of the multilayer body 12 is large. As a result, a reduction in withstand voltage which may occur when the element thickness is simply increased is suppressed or prevented.

Furthermore, the multilayer ceramic capacitor 10 illustrated in FIG. 1 may make the effective area between the third inner electrodes 164 and the first inner electrodes 160 and the effective area between the third inner electrodes 164 and the second inner electrodes 162 constant even if a displacement occurs between stacked layers. Since the ratio of the capacitances is important in a series structure, keeping the effective area identical ensures a high withstand voltage.

In the multilayer ceramic capacitor 10 illustrated in FIG. 1, furthermore, each of the third inner electrodes 164 includes the fifth end portion 164a and the sixth end portion 164b, which are narrower than the center portion. In the fifth end portion 164a at the first end of the third inner electrode 164, the inner electrode corner portion 164c1 at a corner of the fifth end portion 164a is located farther from the first side surface 12c of the multilayer body 12 than the center portion of the third inner electrode 164, and the inner electrode corner portion 164c2 at the other corner of the fifth end portion 164a is also located farther from the second side surface 12d of the multilayer body 12 than the center portion of the third inner electrode 164. Further, in the sixth end portion 164b at the second end of the third inner electrode 164, the inner electrode corner portion 164c3 at a corner of the sixth end portion 164b is located farther from the first side surface 12c of the multilayer body 12 than the center portion of the third inner electrode 164, and the inner electrode corner portion 164c4 at the other corner of the sixth end portion 164b is also located farther from the second side surface 12d of the multilayer body 12 than the center portion of the third inner electrode 164. This structure enables the inner electrode corner portions 164c1, 164c2, 164c3, and 164c4, which are points where the electric field concentrates between the third inner electrodes 164 and the outer electrodes 22 on the first side surface 12c and the second side surface 12d, to be kept away from the outer electrodes 22 within the side portions 20c of the multilayer body 12, and as a result less voltage is applied to the side portions 20c of the multilayer body 12.

In the multilayer ceramic capacitor 10 illustrated in FIG. 1, furthermore, the fourth inner electrodes 166 include the fourth inner electrode 166 located between the first inner electrode 160 or the second inner electrode 162 closest to the first main surface 12a and the fifth inner electrode 168 on the first main surface 12a side, and the fourth inner electrode 166 located between the first inner electrode 160 or the second inner electrode 162 closest to the second main surface 12b and the fifth inner electrode 168 on the second main surface 12b side. This structure suppresses or prevents electric field concentration that may occur between the outer electrodes 22 disposed on the first main surface 12a and the first inner electrode 160 or the second inner electrode 162 closest to the first main surface 12a and between the outer electrodes 22 disposed on the second main surface 12b and the first inner electrode 160 or the second inner electrode 162 closest to the second main surface 12b.

Furthermore, due to the presence of the fourth inner electrodes 166, it is possible to also suppress or prevent an increase in electric field concentration at electrode end portions which may occur when the element thickness is large between the first inner electrode 160 closest to the first main surface 12*a* or the second inner electrode 162 closest to the first main surface 12*a* and the fourth inner electrode 166 on the first main surface 12*a* side and between the first inner electrode 160 closest to the second main surface 12*b* or the second inner electrode 162 closest to the second main surface 12*b* and the fourth inner electrode 166 on the second main surface 12*b* side. A reduction in withstand voltage which may occur when the element thickness is simply increased is suppressed or prevented.

In the multilayer ceramic capacitor 10 illustrated in FIG. 1, moreover, the fifth inner electrodes 168 include the fifth inner electrode 168 located closest to the first main surface 12*a*, and the fifth inner electrode 168 located closest to the second main surface 12*b* of the multilayer body 12. This structure suppresses or prevents electric field concentration that may occur between the outer electrodes 22 disposed on the first main surface 12*a* and the first inner electrode 160 or the second inner electrode 162 closest to the first main surface 12*a* and between the outer electrodes 22 disposed on the second main surface 12*b* and the first inner electrode 160 or the second inner electrode 162 closest to the second main surface 12*b*.

Furthermore, the fourth inner electrode portion 166*a* is shaped to have the seventh end portion 166*a*1 having a width smaller than the width of the second end of the fourth inner electrode portion 166*a*, and the fourth inner electrode portion 166*b* is also shaped to have the eighth end portion 166*b*1 having a width smaller than the width of the second end of the fourth inner electrode portion 166*b*. The fifth inner electrode portion 168*a* is shaped to have the ninth end portion 168*a*1 having a width smaller than the width of the second end of the fifth inner electrode portion 168*a*, and the fifth inner electrode portion 168*b* is also shaped to have the tenth end portion 168*b*1 having a width smaller than the width of the second end of the fifth inner electrode portion 168*b*. This structure allows the entirety of the fourth inner electrode portion 166*a* to be located between the fifth inner electrode portion 168*a* and the first inner electrode 160 or the second inner electrode 162, which are stacked vertically on the fourth inner electrode portion 166*a*, and also allows the entirety of the fourth inner electrode portion 166*b* to be located between the fifth inner electrode portion 168*b* and the first inner electrode 160 or the second inner electrode 162, which are stacked vertically on the fourth inner electrode portion 166*b*. This structure more reliably suppresses or prevents concentration of the electric field that may occur between the outer electrodes 22 disposed on the first main surface 12*a* and the first inner electrode 160 or the second inner electrode 162 closest to the first main surface 12*a* and between the outer electrodes 22 disposed on the second main surface 12*b* and the first inner electrode 160 or the second inner electrode 162 closest to the second main surface 12*b*.

Additionally, the multilayer ceramic capacitor 10 illustrated in FIG. 1 further includes the auxiliary electrodes 18, that is, the first auxiliary electrodes 180, the second auxiliary electrodes 182, the third auxiliary electrodes 184, and the fourth auxiliary electrodes 186. This structure improves connectivity between the outer electrodes 22 and the inner electrodes 16. Specifically, although a limited number of inner electrodes 16 are easily diffused into the multilayer body 12, the use of the auxiliary electrodes 18 relatively increases the number of inner electrodes 16 in the multilayer body 12. As a result, the Ni diffusion across the inner electrodes 16 is reduced. Thus, it is possible to suppress or prevent burning of the inner electrodes 16 which may be caused by diffusion of the inner electrodes 16, and as a result it is possible to improve connectivity between the outer electrode 22 and the inner electrodes 16.

Because of the advantages described above, the multilayer ceramic capacitor 10 illustrated in FIG. 1 keeps sufficient capacitance per unit volume and suppresses or prevents a reduction in withstand voltage characteristics.

Second Preferred Embodiment

A multilayer ceramic capacitor according to a second preferred embodiment of the present invention will be described in detail with reference to the drawings. The multilayer ceramic capacitor according to the second preferred embodiment of the present invention includes inner electrodes having a different shape from the inner electrodes 16 of the multilayer ceramic capacitor 10 according to the first preferred embodiment of the present invention. A structure similar to that of the multilayer ceramic capacitor 10 according to the first preferred embodiment of the present invention is not described again herein.

Figure 10A:
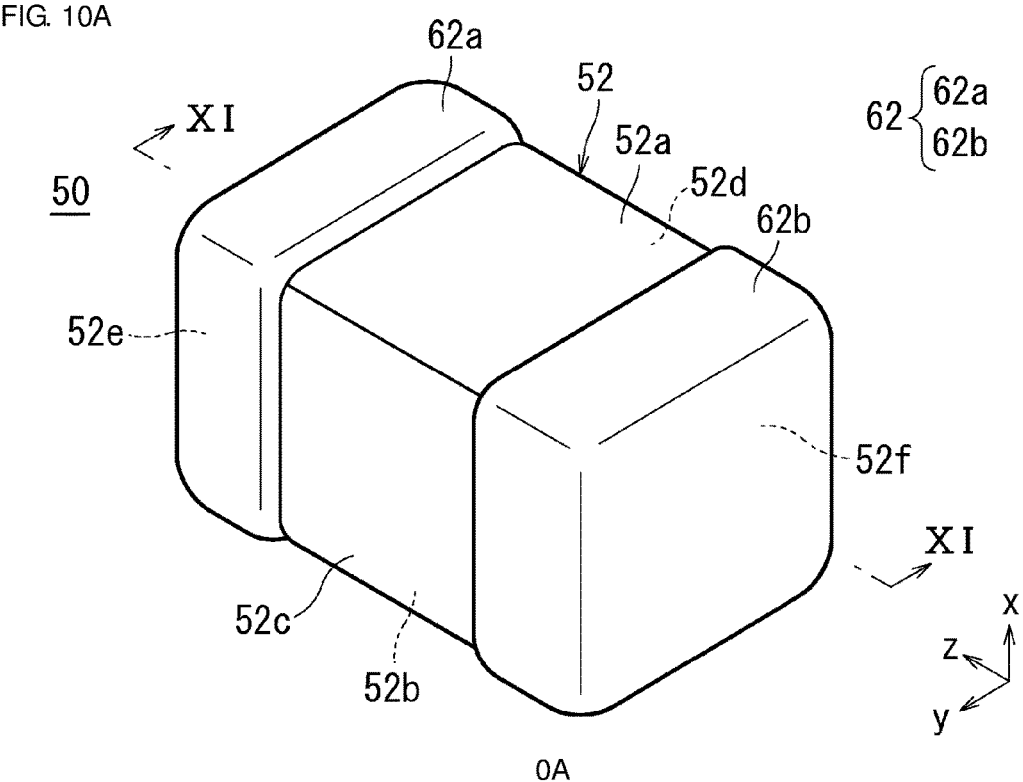
FIG. 10A is an external perspective view illustrating an example of a multilayer ceramic capacitor according to a second preferred embodiment of the present invention.
Figure 10B:
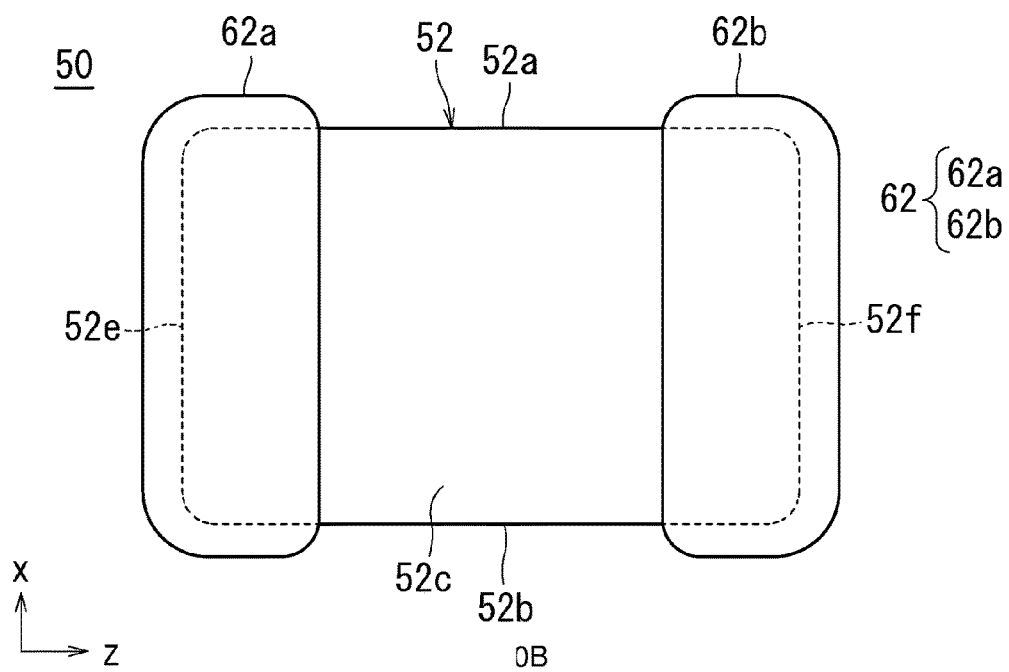
FIG. 10B is a front view of the multilayer ceramic capacitor illustrated in FIG. 10A.
Figure 11:
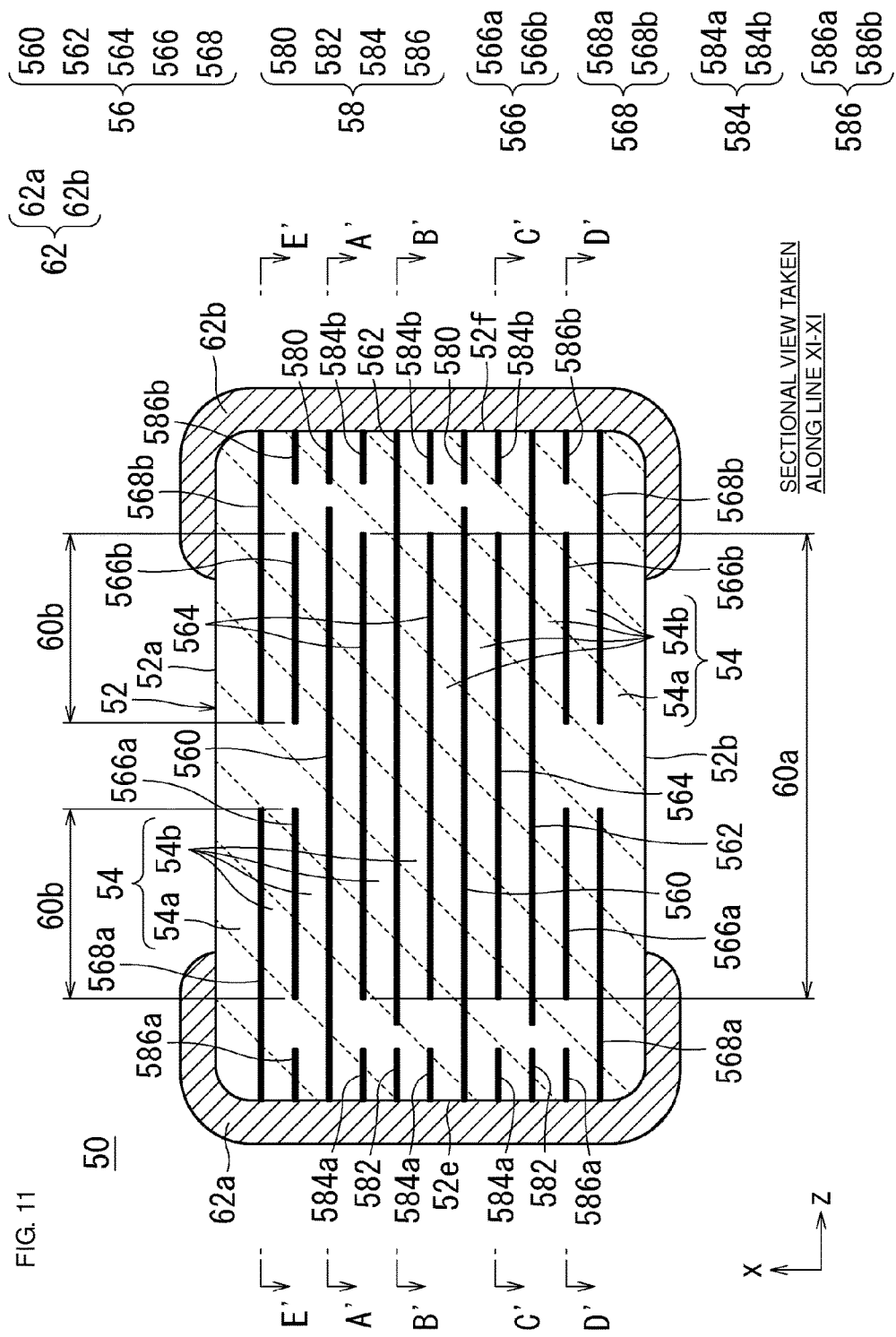
FIG. 11 is a sectional view of the multilayer ceramic capacitor according to the second preferred embodiment of the present invention, taken along line XI-XI in FIG. 10A.
Figure 12:
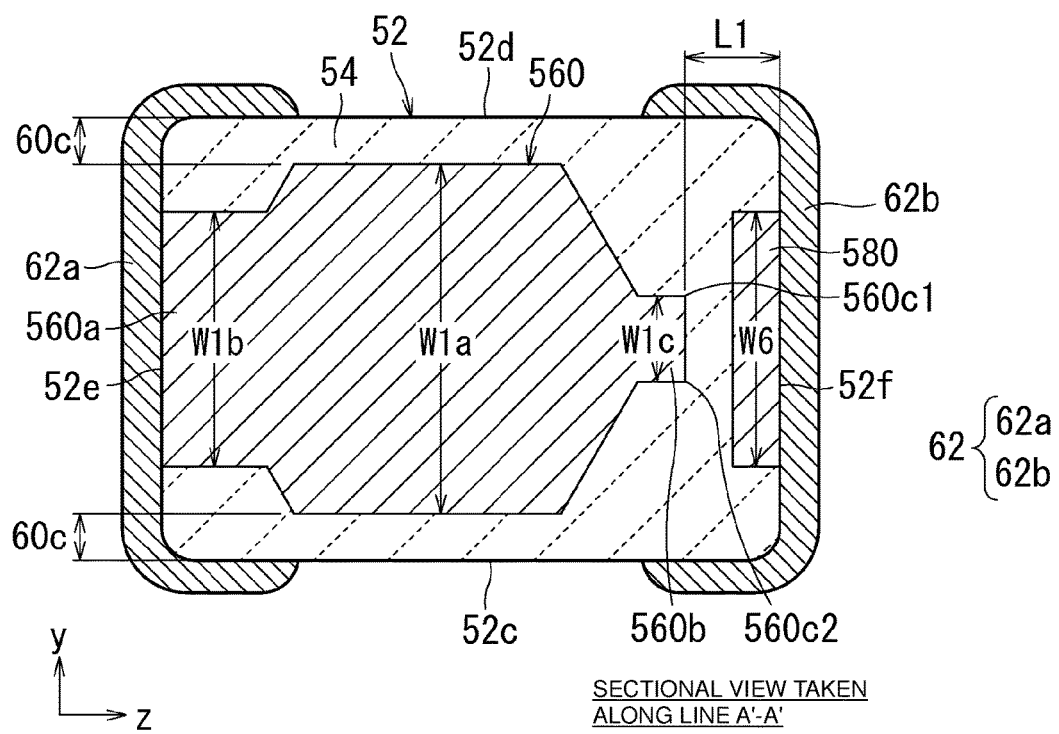
FIG. 12 is a sectional view of the multilayer ceramic capacitor according to the second preferred embodiment, taken along line A'-A' in FIG. 11.
Figure 13:
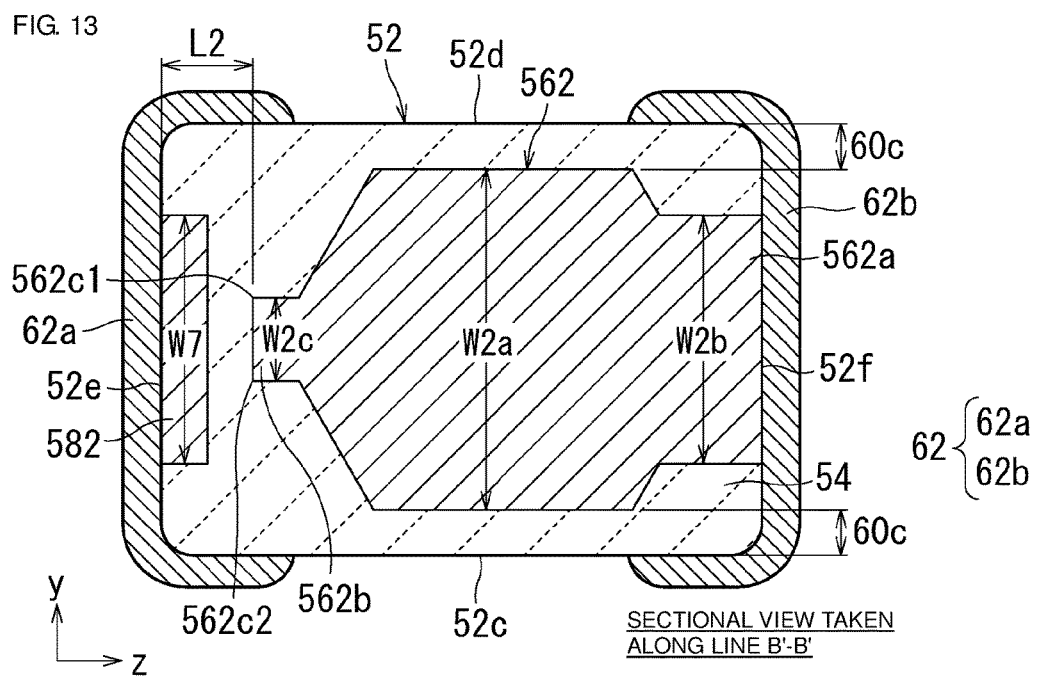
FIG. 13 is a sectional view of the multilayer ceramic capacitor according to the first preferred embodiment, taken along line B'-B' in FIG. 11.
Figure 14:
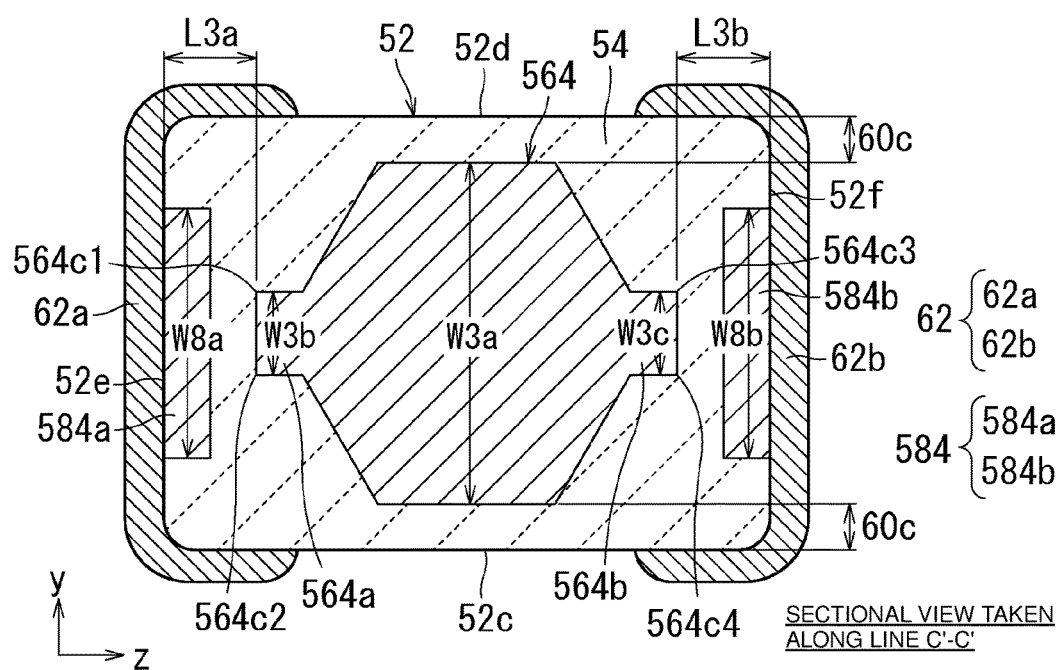
FIG. 14 is a sectional view of the multilayer ceramic capacitor according to the first preferred embodiment, taken along line C'-C' in FIG. 11.
Figure 15:
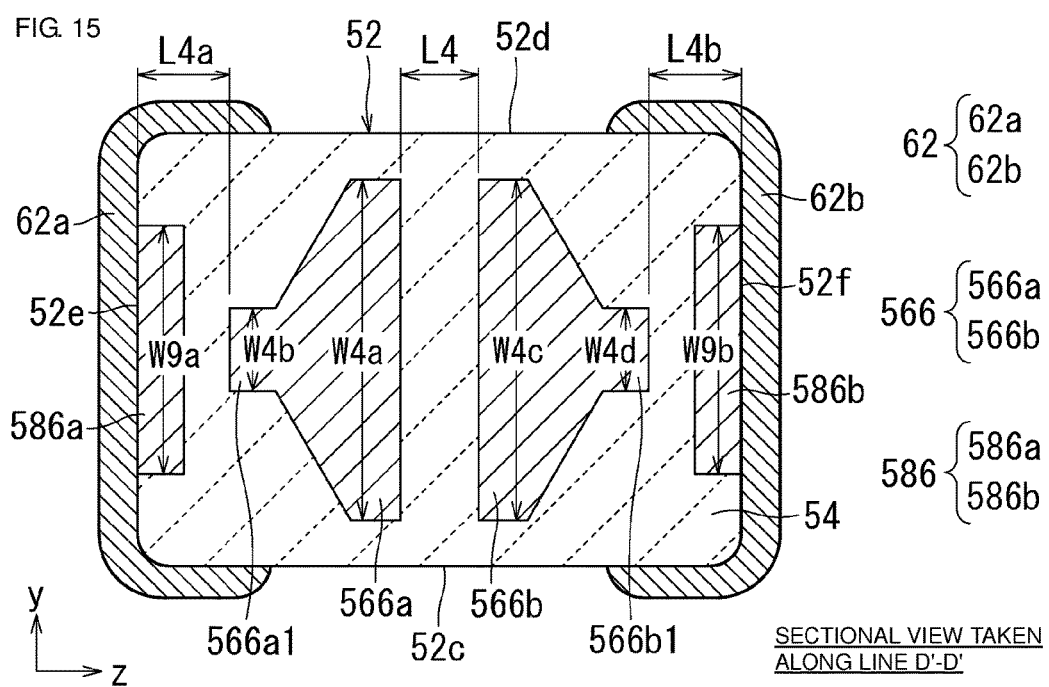
FIG. 15 is a sectional view of the multilayer ceramic capacitor according to the first preferred embodiment, taken along line D'-D' in FIG. 11.
Figure 16:
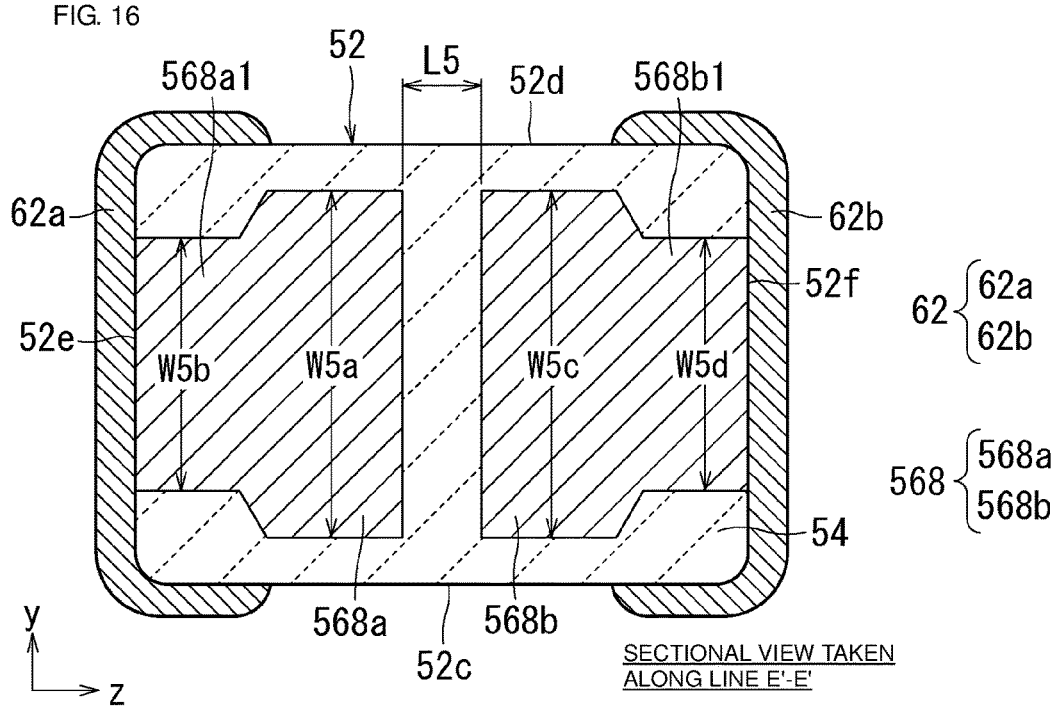
FIG. 16 is a sectional view of the multilayer ceramic capacitor according to the first preferred embodiment, taken along line E'-E' in FIG. 11.
Figure 17:
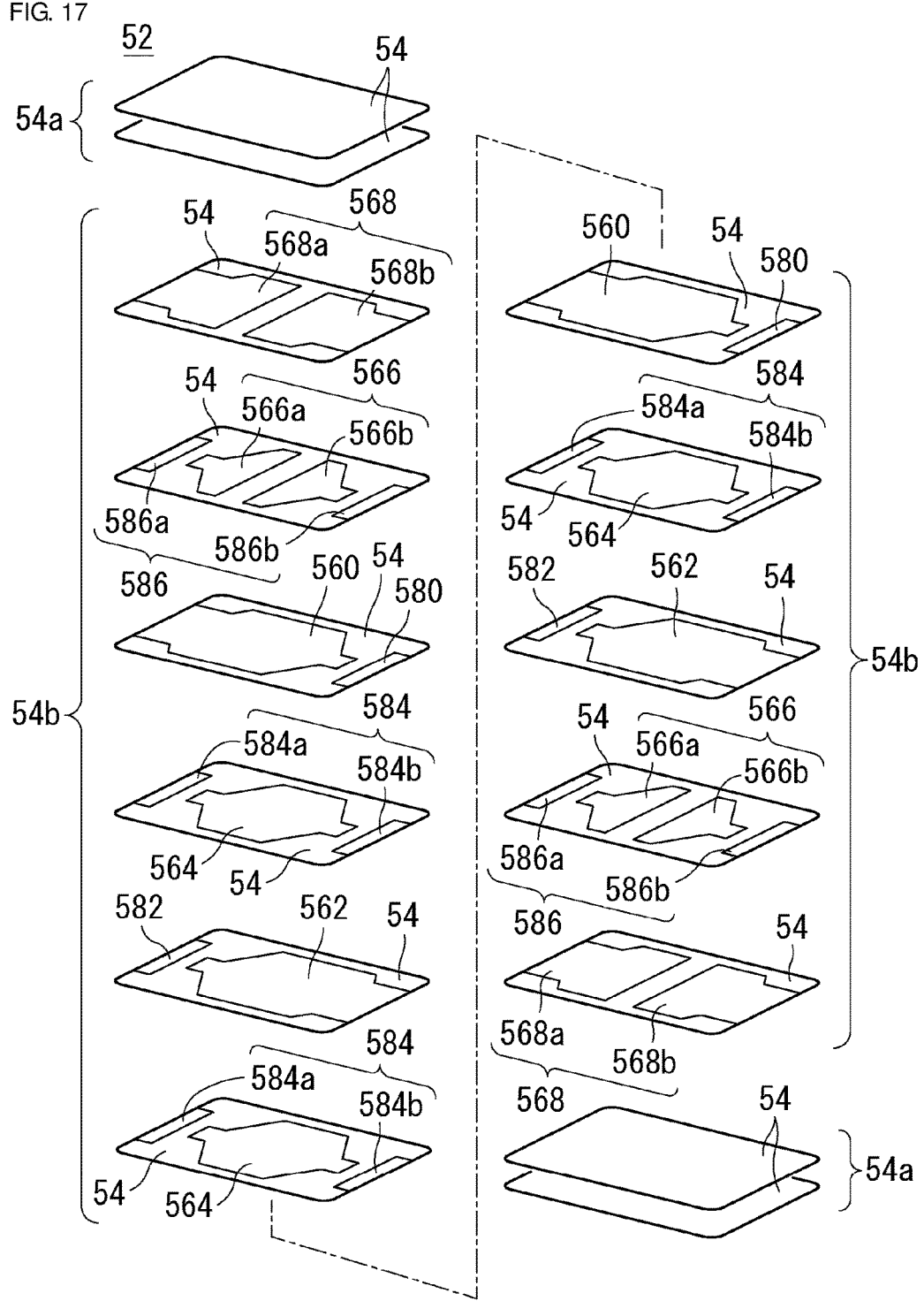
FIG. 17 is an exploded perspective view of a multilayer body illustrated in FIG. 10A.

FIG. 10A is an external perspective view illustrating an example of the multilayer ceramic capacitor according to the second preferred embodiment of the present invention, and FIG. 10B is a front view of the multilayer ceramic capacitor illustrated in FIG. 10A. FIG. 11 is a sectional view of the multilayer ceramic capacitor according to the second preferred embodiment of the present invention, taken along line XI-XI in FIG. 10A. FIG. 12 is a sectional view of the multilayer ceramic capacitor according to the second preferred embodiment, taken along line A'-A' in FIG. 11. FIG. 13 is a sectional view of the multilayer ceramic capacitor according to the first preferred embodiment, taken along line B'-B' in FIG. 11. FIG. 14 is a sectional view of the multilayer ceramic capacitor according to the first preferred embodiment, taken along line C'-C' in FIG. 11. FIG. 15 is a sectional view of the multilayer ceramic capacitor according to the first preferred embodiment, taken along line D'-D' in FIG. 11. FIG. 16 is a sectional view of the multilayer ceramic capacitor according to the first preferred embodiment, taken along line E'-E' in FIG. 11. FIG. 17 is an exploded perspective view of a multilayer body illustrated in FIG. 10A.

As illustrated in FIG. 10A, a multilayer ceramic capacitor 50 according to the second preferred embodiment of the present invention includes a multilayer body 52.

The multilayer body 52 includes a plurality of dielectric layers 54, which are stacked on one another, a plurality of inner electrodes 56, and a plurality of auxiliary electrodes 58. The multilayer body 52 further includes a first main surface 52*a*, a second main surface 52*b*, a first side surface 52*c*, a second side surface 52*d*, a first end surface 52*e*, and a second end surface 52*f*. The first main surface 52*a* and the second main surface 52*b* face each other in a stacking direction x. The first side surface 52*c* and the second side surface 52*d* face each other in a width direction y orthogonal to the stacking direction x. The first end surface 52*e* and the second end surface 52*f* face each other in a length direction z orthogonal to the stacking direction x and the width direction y. The multilayer body 52 has a substantially rectangular parallelepiped shape.

The dielectric layers 54 include outer layer portions 54*a* and an inner layer portion 54*b*. The outer layer portions 54*a* are located near the first main surface 52*a* and the second main surface 52*b* of the multilayer body 52. The outer layer portions 54*a* include the dielectric layer 54 located between the first main surface 52*a* and the inner electrode 56 closest to the first main surface 52a, and the dielectric layer 54 located between the second main surface 52b and the inner electrode 56 closest to the second main surface 52b. The area sandwiched between the outer layer portions 54a corresponds to the inner layer portion 54b.

The inner electrodes 56 include first inner electrodes 560, second inner electrodes 562, third inner electrodes 564, fourth inner electrodes 566, and fifth inner electrodes 568.

Each of the first inner electrodes 560, each of the second inner electrodes 562, each of the third inner electrodes 564, each of the fourth inner electrodes 566, and each of the fifth inner electrodes 568 are disposed on different planes.

Each of the first inner electrodes 560 has a first end extending to the first end surface 52e. Each of the first inner electrodes 560 has a second end not extending to the first end surface 52e or to the second end surface 52f, and a gap area L1 is defined between the second end of the first inner electrode 560 and the second end surface 52f.

Each of the first inner electrodes 560 includes a first end portion 560a and a second end portion 560b that are narrower than a center portion thereof in the length direction z. That is, a length W1b of the first end portion 560a of the first inner electrode 560 in the width direction y between the first side surface 52c and the second side surface 52d and a length W1c of the second end portion 560b of the first inner electrode 560 in the width direction y between the first side surface 52c and the second side surface 52d are each smaller than a length W1a of the center portion of the first inner electrode 560 in the length direction z in the width direction y between the first side surface 52c and the second side surface 52d.

The first end portion 560a at the first end of the first inner electrode 560 extends to the first end surface 52e. In the second end portion 560b at the second end of the first inner electrode 560, an inner electrode corner portion 560c1 at a corner of the second end portion 560b is located farther from the first side surface 52c of the multilayer body 52 than the center portion of the first inner electrode 560 in the length direction z, and an inner electrode corner portion 560c2 at the other corner of the second end portion 560b is located farther from the second side surface 52d of the multilayer body 52 than the center portion of the first inner electrode 560 in the length direction z.

As illustrated in FIG. 12, portions where a wide portion in the center portion of the first inner electrode 560 in the length direction z is connected to the first end portion 560a and the second end portion 560b, which are narrower, have angled corners. Alternatively, the portions may have right-angle corners.

Each of the second inner electrodes 562 has a first end extending to the second end surface 52f. Each of the second inner electrodes 562 has a second end not extending to the first end surface 52e or to the second end surface 52f, and a gap area L2 is defined between the second end of the second inner electrode 562 and the first end surface 52e.

Each of the second inner electrodes 562 includes a third end portion 562a and a fourth end portion 562b that are narrower than a center portion thereof in the length direction z. That is, a length W2b of the third end portion 562a of the second inner electrode 562 in the width direction y between the first side surface 52c and the second side surface 52d and a length W2c of the fourth end portion 562b of the second inner electrode 562 in the width direction y between the first side surface 52c and the second side surface 52d are each smaller than a length W2a of the center portion of the second inner electrode 562 in the length direction z in the width direction y between the first side surface 52c and the second side surface 52d.

The third end portion 562a at the first end of the second inner electrode 562 extends to the second end surface 52f. In the fourth end portion 562b at the second end of the second inner electrode 562, an inner electrode corner portion 562c1 at a corner of the fourth end portion 562b is located farther from the first side surface 52c of the multilayer body 52 than the center portion of the second inner electrode 562 in the length direction z, and an inner electrode corner portion 562c2 at the other corner of the fourth end portion 562b is located farther from the second side surface 52d of the multilayer body 52 than the center portion of the second inner electrode 562 in the length direction z.

As illustrated in FIG. 13, portions where a wide portion in the center portion of the second inner electrode 562 in the length direction z is connected to the third end portion 562a and the fourth end portion 562b, which are narrower, have angled corners. Alternatively, the portions may have right-angle corners.

The third inner electrodes 564 are arranged alternately with the first inner electrodes 560 and the second inner electrodes 562. Each of the third inner electrodes 564 has a first end not extending to the first end surface 52e, and a gap area L3a is defined between the first end of the third inner electrode 564 and the first end surface 52e. Each of the third inner electrodes 564 has a second end not extending to the second end surface 52f, and a gap area L3b is defined between the second end of the third inner electrode 564 and the second end surface 52f.

Each of the third inner electrodes 564 includes a fifth end portion 564a and a sixth end portion 564b that are narrower than a center portion thereof in the length direction z. That is, a length W3b of the fifth end portion 564a of the third inner electrode 564 in the width direction y between the first side surface 52c and the second side surface 52d and a length W3c of the sixth end portion 564b of the third inner electrode 564 in the width direction y between the first side surface 52c and the second side surface 52d are each smaller than a length W3a of the center portion of the third inner electrode 564 in the length direction z in the width direction y between the first side surface 52c and the second side surface 52d.

In the fifth end portion 564a at the first end of the third inner electrode 564, an inner electrode corner portion 564c1 at a corner of the fifth end portion 564a is located farther from the first side surface 52c of the multilayer body 52 than the center portion of the third inner electrode 564 in the length direction z, and an inner electrode corner portion 564c2 at the other corner of the fifth end portion 564a is located farther from the second side surface 52d of the multilayer body 52 than the center portion of the third inner electrode 564 in the length direction z. Also, in the sixth end portion 564b at the second end of the third inner electrode 564, an inner electrode corner portion 564c3 at a corner of the sixth end portion 564b is located farther from the first side surface 52c of the multilayer body 52 than the center portion of the third inner electrode 564 in the length direction z, and an inner electrode corner portion 564c4 at the other corner of the sixth end portion 564b is located farther from the second side surface 52d of the multilayer body 52 than the center portion of the third inner electrode 564 in the length direction z.

As illustrated in FIG. 14, portions where a wide portion in the center portion of the third inner electrode 564 in the length direction z is connected to the fifth end portion 564a and the sixth end portion 564b, which are narrower, have angled corners. Alternatively, the portions may have right-angle corners.

The fourth inner electrodes 566 include a fourth inner electrode 566 located between the first inner electrode 560 or the second inner electrode 562 closest to the first main surface 52a and the fifth inner electrode 568 on the first main surface 52a side, and a fourth inner electrode 566 located between the first inner electrode 560 or the second inner electrode 562 closest to the second main surface 52b and the fifth inner electrode 568 on the second main surface 52b side.

Each of the fourth inner electrodes 566 is separated in a center portion of the multilayer body 12 in the length direction z into portions with a gap area L4 therebetween. Thus, each of the fourth inner electrodes 566 includes a fourth inner electrode portion 566a located near the first end surface 52e and a fourth inner electrode portion 566b located near the second end surface 52f.

A gap area L4a is defined between a first end of the fourth inner electrode portion 566a and the first end surface 52e of the multilayer body 52, and a gap area L4b is defined between the first end of the fourth inner electrode portion 566b and the second end surface 52f of the multilayer body 52.

A second end of the fourth inner electrode portion 566a (the end of the fourth inner electrode portion 566a farther from the first end surface 52e) and a second end of the fourth inner electrode portion 566b (the end of the fourth inner electrode portion 566b farther from the second end surface 52f) are disposed with the gap area L4 interposed therebetween.

Accordingly, none of the first and second ends of the fourth inner electrode portion 566a extends to the first end surface 52e or to the second end surface 52f, and none of the first and second ends of the fourth inner electrode portion 566b extends to the first end surface 52e or to the second end surface 52f.

While the fourth inner electrode portion 566a may have any shape, as illustrated in FIG. 15, the fourth inner electrode portion 566a includes at the first end thereof a seventh end portion 566a1 narrower than the second end thereof. Likewise, the fourth inner electrode portion 566b includes at the first end thereof an eighth end portion 566b1 narrower than the second end thereof. That is, a length W4b of the seventh end portion 566a1 of the fourth inner electrode portion 566a in the width direction y between the first side surface 52c and the second side surface 52d is smaller than a length W4a of the second end of the fourth inner electrode portion 566a in the width direction y between the first side surface 52c and the second side surface 52d, and a length W4d of the eighth end portion 566b1 of the fourth inner electrode portion 566b in the width direction y between the first side surface 52c and the second side surface 52d is smaller than a length W4c of the second end of the fourth inner electrode portion 566b in the width direction y between the first side surface 52c and the second side surface 52d.

Further, a portion where a wide portion at the second end of the fourth inner electrode portion 566a is connected to the seventh end portion 566a1, which is narrower, has angled corners. Alternatively, the portion may have right-angle corners. Likewise, a portion where a wide portion at the second end of the fourth inner electrode portion 566b is connected to the eighth end portion 566b1, which is narrower, has angled corners. Alternatively, the portion may have right-angle corners.

The fifth inner electrodes 568 include a fifth inner electrode 568 located closest to the first main surface 52a, and a fifth inner electrode 568 located closest to the second main surface 52b of the multilayer body 52.

Each of the fifth inner electrodes 568 is separated in the center portion of the multilayer body 52 in the length direction z into portions with a gap area L5 therebetween. Thus, each of the fifth inner electrodes 568 includes a fifth inner electrode portion 568a located near the first end surface 52e and a fifth inner electrode portion 568b located near the second end surface 52f.

A first end of the fifth inner electrode portion 568a extends to the first end surface 52e, and a first end of the fifth inner electrode portion 568b extends to the second end surface 52f.

A second end of the fifth inner electrode portion 568a (the end of the fifth inner electrode portion 568a farther from the first end surface 52e) and a second end of the fifth inner electrode portion 568b (the end of the fifth inner electrode portion 568b farther from the second end surface 52f) are disposed with the gap area L5 interposed therebetween.

While the fifth inner electrode portion 568a may have any shape, as illustrated in FIG. 16, the fifth inner electrode portion 568a includes at the first end thereof a ninth end portion 568a1 narrower than the second end thereof. Likewise, the fifth inner electrode portion 568b includes at the first end thereof a tenth end portion 568b1 narrower than the second end thereof. That is, a length W5b of the ninth end portion 568a1 of the fifth inner electrode portion 568a in the width direction y between the first side surface 52c and the second side surface 52d is smaller than a length W5a of the second end of the fifth inner electrode portion 568a in the width direction y between the first side surface 52c and the second side surface 52d, and a length W5d of the tenth end portion 568b1 of the fifth inner electrode portion 568b in the width direction y between the first side surface 52c and the second side surface 52d is smaller than a length W5c of the second end of the fifth inner electrode portion 568b in the width direction y between the first side surface 52c and the second side surface 52d.

The ninth end portion 568a1 at the first end of the fifth inner electrode portion 568a extends to the first end surface 52e, and the tenth end portion 568b1 at the first end of the fifth inner electrode portion 568b extends to the second end surface 52f.

Further, a portion where a wide portion at the second end of the fifth inner electrode portion 568a is connected to the ninth end portion 568a1, which is narrower, has angled corners. Alternatively, the portion may have right-angle corners. Likewise, a portion where a wide portion at the second end of the fifth inner electrode portion 568b is connected to the tenth end portion 568b1, which is narrower, has angled corners. Alternatively, the portion may have right-angle corners.

The multilayer body 52 includes first opposing-electrode portions 60a. In the first opposing-electrode portions 60a, the first inner electrodes 560 and the third inner electrodes 564 face each other and the second inner electrodes 562 and the third inner electrodes 564 face each other in the inner layer portion 54b of the dielectric layers 54. The multilayer body 52 also includes second opposing-electrode portions 60b. In the second opposing-electrode portions 60b, the fourth inner electrodes 566 and the fifth inner electrodes 568 face each other in the inner layer portion 54b of the dielectric layers 54. The multilayer body 52 further includes side portions (hereinafter referred to as "W gaps") 60c. The side portions 60c are defined between first ends of the first opposing-electrode portions 60a and the second opposing-electrode portions 60b in the width direction y and the first side surface 52c and between second ends of the first opposing-electrode portions 60a and the second opposing-electrode portions 60b in the width direction y and the second side surface 52d.

When viewed in the stacking direction x, the second end portions 560b of the first inner electrodes 560 extend so as to be closer to the second end surface 52f than the sixth end portions 564b of the third inner electrodes 564, and the fourth end portions 562b of the second inner electrodes 562 extend so as to be closer to the first end surface 52e than the fifth end portions 564a of the third inner electrodes 564.

The plurality of auxiliary electrodes 58 of the multilayer body 52 include first auxiliary electrodes 580, second auxiliary electrodes 582, third auxiliary electrodes 584, and fourth auxiliary electrodes 586.

The first auxiliary electrodes 580 are disposed on the same planes as the first inner electrodes 560 and are each spaced apart from the corresponding one of the first inner electrodes 560. Thus, each first auxiliary electrode 580 is arranged in the gap area L1. The first auxiliary electrode 580 extends to the second end surface 52f. The first auxiliary electrode 580 may have any shape. Preferably, the first auxiliary electrode 580 has a substantially rectangular shape.

The second auxiliary electrodes 582 are disposed on the same planes as the second inner electrodes 562 and are each spaced apart from the corresponding one of the second inner electrodes 562. Thus, each second auxiliary electrode 582 is arranged in the gap area L2. The second auxiliary electrode 582 extends to the first end surface 52e. The second auxiliary electrode 582 may have any shape. Preferably, the second auxiliary electrode 582 has a substantially rectangular shape.

The third auxiliary electrodes 584 are disposed on the same planes as the third inner electrodes 564 and are each separated in the length direction z of the multilayer body 52 into portions with the corresponding one of the third inner electrodes 564 therebetween. Each third auxiliary electrode 584 includes a third auxiliary electrode portion 584a located near the first end surface 52e and a third auxiliary electrode portion 584b located near the second end surface 52f. The third auxiliary electrode portion 584a is arranged in the gap area L3a, and the third auxiliary electrode portion 584b is arranged in the gap area L3b. The third auxiliary electrode portion 584a extends to the first end surface 52e, and the third auxiliary electrode portion 584b extends to the second end surface 52f. The third auxiliary electrode portion 584a and the third auxiliary electrode portion 584b may have any shape. Preferably, the third auxiliary electrode portion 584a and the third auxiliary electrode portion 584b have a substantially rectangular shape.

The fourth auxiliary electrodes 586 are disposed on the same planes as the fourth inner electrodes 566 and are each separated in the length direction z of the multilayer body 52 into portions with the corresponding one of the fourth inner electrodes 566 therebetween. Each fourth auxiliary electrode 586 includes a fourth auxiliary electrode portion 586a located near the first end surface 52e and a fourth auxiliary electrode portion 586b located near the second end surface 52f. The fourth auxiliary electrode portion 586a is arranged in the gap area L4a, and the fourth auxiliary electrode portion 586b is arranged in the gap area L4b. The fourth auxiliary electrode portion 586a extends to the first end surface 52e, and the fourth auxiliary electrode portion 586b extends to the second end surface 52f. The fourth auxiliary electrode portion 586a and the fourth auxiliary electrode portion 586b may have any shape. Preferably, the fourth auxiliary electrode portion 586a and the fourth auxiliary electrode portion 586b have a substantially rectangular shape.

The length W1c of the second end portion 560b of the first inner electrode 560 in the width direction y between the first side surface 52c and the second side surface 52d is smaller than the length W1b of the first end portion 560a of the first inner electrode 560 in the width direction y between the first side surface 52c and the second side surface 52d and is also smaller than the length W6 of the first auxiliary electrode 580 in the width direction y between the first side surface 52c and the second side surface 52d.

The length W2c of the fourth end portion 562b of the second inner electrode 562 in the width direction y between the first side surface 52c and the second side surface 52d is smaller than the length W2b of the third end portion 562a of the second inner electrode 562 in the width direction y between the first side surface 52c and the second side surface 52d and is also smaller than the length W7 of the second auxiliary electrode 582 in the width direction y between the first side surface 52c and the second side surface 52d.

The length W3b of the fifth end portion 564a of the third inner electrode 564 in the width direction y between the first side surface 52c and the second side surface 52d, the length W3c of the sixth end portion 564b of the third inner electrode 564 in the width direction y between the first side surface 52c and the second side surface 52d, and the lengths W8a and W8b of the third auxiliary electrode portion 584a and the third auxiliary electrode portion 584b in the width direction y between the first side surface 52c and the second side surface 52d are each smaller than the length W1b of the first end portion 560a of the first inner electrode 560 in the width direction y between the first side surface 52c and the second side surface 52d, the length W6 of the first auxiliary electrode 580 in the width direction y between the first side surface 52c and the second side surface 52d, the length W2b of the third end portion 562a of the second inner electrode 562 in the width direction y between the first side surface 52c and the second side surface 52d, and the length W7 of the second auxiliary electrode 582 in the width direction y between the first side surface 52c and the second side surface 52d.

The multilayer body 52 includes outer electrodes 62 on the first end surface 52e and the second end surface 52f. The outer electrodes 62 include a first outer electrode 62a and a second outer electrode 62b.

The first outer electrode 62a is defined on the first end surface 52e of the multilayer body 52. The first outer electrode 62a covers the first end surface 52e of the multilayer body 52, extend from the first end surface 52e, and cover portion of the first main surface 52a, the second main surface 52b, the first side surface 52c, and the second side surface 52d. In this case, the first outer electrode 62a is electrically connected to the first end portions 560a of the first inner electrodes 560 and the ninth end portions 568a1 of the fifth inner electrode portions 568a. The first outer electrode 62a may be defined only on the first end surface 52e of the multilayer body 52.

The second outer electrode 62b is defined on the second end surface 52f of the multilayer body 52. The second outer electrode 62b covers the second end surface 52f of the multilayer body 52, extend from the second end surface 52f, and cover portion of the first main surface 52a, the second main surface 52b, the first side surface 52c, and the second side surface 52d. In this case, the second outer electrode 62b is electrically connected to the third end portions 562a of the second inner electrodes 562 and the tenth end portions 568b1 of the fifth inner electrode portions 568b. The second outer electrode 62b may be defined only on the second end surface 52f of the multilayer body 52.

The multilayer ceramic capacitor 50 illustrated in FIG. 10 achieves the following advantages in addition to advantages similar to those of the multilayer ceramic capacitor 10 illustrated in FIG. 1.

In the multilayer ceramic capacitor 50 illustrated in FIG. 10, the length W1c of the second end portion 560b of the first inner electrode 560 in the width direction y between the first side surface 52c and the second side surface 52d is smaller than the length W1b of the first end portion 560a of the first inner electrode 560 in the width direction y between the first side surface 52c and the second side surface 52d and the length W6 of the first auxiliary electrode 580 in the width direction y between the first side surface 52c and the second side surface 52d. The length W2c of the fourth end portion 562b of the second inner electrode 562 in the width direction y between the first side surface 52c and the second side surface 52d is smaller than the length W2b of the third end portion 562a of the second inner electrode 562 in the width direction y between the first side surface 52c and the second side surface 52d and the length W7 of the second auxiliary electrode 582 in the width direction y between the first side surface 52c and the second side surface 52d. The length W3b of the fifth end portion 564a of the third inner electrode 564 in the width direction y between the first side surface 52c and the second side surface 52d, the length W3c of the sixth end portion 564b of the third inner electrode 564 in the width direction y between the first side surface 52c and the second side surface 52d, and the lengths W8a and W8b of the third auxiliary electrode portion 584a and the third auxiliary electrode portion 584b in the width direction y between the first side surface 52c and the second side surface 52d are each smaller than the length W1b of the first end portion 560a of the first inner electrode 560 in the width direction y between the first side surface 52c and the second side surface 52d, the length W6 of the first auxiliary electrode 580 in the width direction y between the first side surface 52c and the second side surface 52d, the length W2b of the third end portion 562a of the second inner electrode 562 in the width direction y between the first side surface 52c and the second side surface 52d, and the length W7 of the second auxiliary electrode 582 in the width direction y between the first side surface 52c and the second side surface 52d. This structure further ensures that, when viewed in the stacking direction x, the third inner electrodes 564 are covered by the first inner electrodes 560 and the second inner electrodes 562. This maintains more sufficient capacitance between the first inner electrodes 560 and the third inner electrodes 564 and between the second inner electrodes 562 and the third inner electrodes 564.

EXPERIMENTAL EXAMPLE 1

An example of the multilayer ceramic capacitor 10 illustrated in FIG. 1 was manufactured using the method described above. An experiment was conducted to measure the capacitance based on predetermined conditions, and an experiment was conducted to examine the withstand voltage characteristics (AC breakdown voltage (AC-BDV)).

First, as Example 1, the multilayer ceramic capacitor 10 illustrated in FIG. 1 having the specifications below was created in accordance with the multilayer ceramic capacitor manufacturing method described above.

Chip size (design values): length×width×
height=3200 mm×2500 mm×2000 mm

Material of dielectric layer: $BaTiO_3$
Capacitance: 40 nF
Rated voltage: 630 V
Structure of outer electrode: structure including underlying electrode layer (baked layer) and plating layer
Underlying electrode layer (baked layer): including conductive metal (Cu) and glass
Plating layer: two-layer structure of Ni plating layer and Sn plating layer
Structure of first to fifth inner electrodes
Material of first to fifth inner electrodes: Ni
Shape of first to fifth inner electrodes: as illustrated in FIGS. 2 to 8
Structure of first to fourth auxiliary electrodes
Material of first to fourth auxiliary electrodes: Ni
Shape of first to fourth auxiliary electrodes: as illustrated in FIGS. 2 to 8

Figure 18:
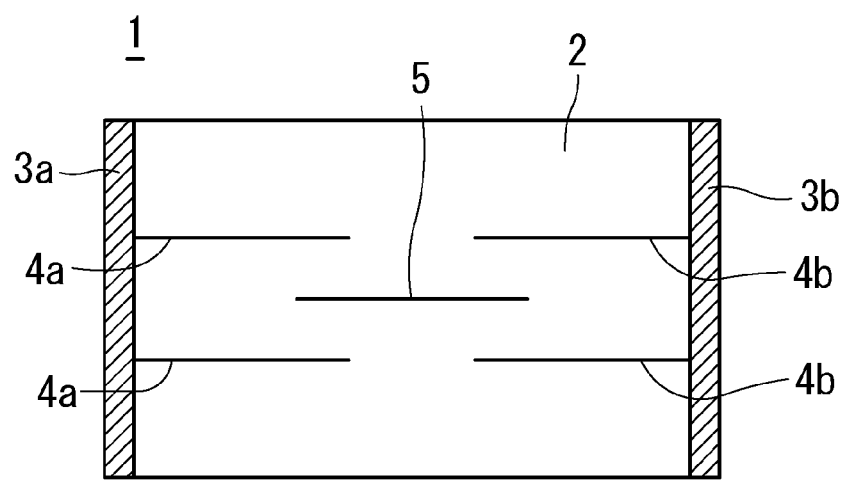
FIG. 18 is a sectional view of a multilayer ceramic capacitor of the related art.

Then, as Comparative Example 1, a multilayer ceramic capacitor having an inner electrode structure of the related art, as illustrated in FIG. 18, was created. In the multilayer ceramic capacitor according to Comparative Example 1, outer electrodes were formed so as to extend from one end surface to both main surfaces and to both side surfaces and extend from the other end surface to both main surfaces and to both side surfaces. Other conditions were the same as those in Example 1.

In each of Example 1 and Comparative Example 1, 100 samples were prepared for an experiment to measure the capacitance and 50 samples were prepared for an experiment to examine the withstand voltage characteristics.

Capacitance Measurement Method

To measure the capacitance, 100 multilayer ceramic capacitors of Example 1 and 100 multilayer ceramic capacitors of Comparative Example 1 were heat-treated at 150° C. for an hour and were then left at room temperature for 24 hours. Thereafter, the capacitances of the multilayer ceramic capacitors were measured using an LCR meter (automatic balancing bridge method) at a temperature of 25° C. under an AC electric field of 1.0 Vrms with a measurement frequency of 1 kHz.

The average of the capacitances of the 100 multilayer ceramic capacitors of Example 1 was used as the value of the capacitances of the multilayer ceramic capacitors of Example 1, and the average of the capacitances of the 100 multilayer ceramic capacitors of Comparative Example 1 was used as the value of the capacitances of the multilayer ceramic capacitors of Comparative Example 1.

AC Breakdown Voltage Measurement Method

To examine the withstand voltage characteristics, measurement was conducted on 50 multilayer ceramic capacitors of Example 1 and 50 multilayer ceramic capacitors of Comparative Example 1 by using an alternating-current (AC) automatic booster withstand voltage tester at a temperature of 25° C. under a condition in which the AC voltage was increased at a rate of 100 Vrms/s. The voltage obtained when the multilayer ceramic capacitor experienced dielectric breakdown and the current became 50 mA was used as the breakdown voltage (BDV).

The mean breakdown voltage of the 50 multilayer ceramic capacitors of Example 1 was used as the breakdown voltage of the multilayer ceramic capacitors of Example 1, and the mean breakdown voltage of the 50 multilayer ceramic capacitors of Comparative Example 1 was used as the breakdown voltage of the multilayer ceramic capacitors of Comparative Example 1.

Table 1 gives the measurement results of the capacitance and the AC breakdown voltage for Example 1 and Comparative Example 1 in the experiment for measuring the capacitance and the experiment for examining the withstand voltage characteristics for Experimental Example 1.

TABLE 1

|                      | Capacitance (nF) | AC breakdown voltage (kV) |
|----------------------|------------------|---------------------------|
| Example 1            | 54.86            | 2.33                      |
| Comparative Example 1| 40.00            | 2.32                      |

In the results, the multilayer ceramic capacitor according to Example 1 had a capacitance of 54.86 nF and an AC breakdown voltage of 2.33 kV, and the multilayer ceramic capacitor according to Comparative Example 1 had a capacitance of 40.00 nF and an AC breakdown voltage of 2.32 kV. The results therefore show that a multilayer ceramic capacitor according to a preferred embodiment of the present invention suppresses or prevents a reduction in withstand voltage characteristics while keeping sufficient capacitance per unit volume.

EXPERIMENTAL EXAMPLE 2

The multilayer ceramic capacitor 50 illustrated in FIG. 10 was manufactured using the method described above. An experiment was conducted to measure the capacitance based on predetermined conditions, and an experiment was conducted to examine the withstand voltage characteristics (AC breakdown voltage (AC-BDV)).

First, as Example 2, the multilayer ceramic capacitor 50 illustrated in FIG. 10 having the specifications below was created in accordance with the multilayer ceramic capacitor manufacturing method described above.

Chip size (design values): length×width×
height=3200 mm×2500 mm×2000 mm

Material of dielectric layer: BaTiO$_3$
Capacitance: 40 nF
Rated voltage: 630 V
Structure of outer electrode: structure including underlying electrode layer (baked layer) and plating layer
  Underlying electrode layer (baked layer): including conductive metal (Cu) and glass
  Plating layer: two-layer structure of Ni plating layer and Sn plating layer
Structure of first to fifth inner electrodes
Material of first to fifth inner electrodes: Ni
Shape of first to fifth inner electrodes: as illustrated in FIGS. 11 to 17
Structure of first to fourth auxiliary electrodes
Material of first to fourth auxiliary electrodes: Ni
Shape of first to fourth auxiliary electrodes: as illustrated in FIGS. 11 to 17
Comparative Example 1 used the samples of Comparative Example 1 used in Experimental Example 1.

In each of Example 2 and Comparative Example 1, 100 samples were prepared for an experiment to measure the capacitance and 50 samples were prepared for an experiment to examine the withstand voltage characteristics.

In Experimental Example 2, methods similar to those in Experimental Example 1 were used as an experimental method for measuring a capacitance and an AC breakdown voltage measurement method for examining the withstand voltage characteristics.

Table 2 gives the measurement results of the capacitance and the AC breakdown voltage for Example 2 and Comparative Example 1 in the experiment for measuring the capacitance and the experiment for examining the withstand voltage characteristics for Experimental Example 2.

TABLE 2

|                      | Capacitance (nF) | AC breakdown voltage (kV) |
|----------------------|------------------|---------------------------|
| Example 2            | 54.29            | 2.55                      |
| Comparative Example 1| 40.00            | 2.32                      |

The multilayer ceramic capacitor according to Example 2 had a capacitance of 54.29 nF and an AC breakdown voltage of 2.55 kV, and the multilayer ceramic capacitor according to Comparative Example 1 had a capacitance of 40.00 nF and an AC breakdown voltage of 2.32 kV. The results therefore show that a multilayer ceramic capacitor according to a preferred embodiment of the present invention suppresses or prevents a reduction in withstand voltage characteristics while keeping sufficient capacitance per unit volume.

In the description of the preferred embodiments described above, structures may be interchangeably combined, if possible. The preferred embodiments disclosed herein should be considered to be illustrative only but not restrictive in every respect. The scope of the present invention is not indicated by the aforementioned descriptions but is indicated by the scope of the appended claims. The scope of the present invention is intended to include the meaning equivalent to the appended claims and all the modifications within the scope of the present invention. That is, for example, the thickness of dielectric layers, the number of layers, the area of opposing electrodes, and the outer dimensions of the multilayer ceramic capacitor are not limited to those disclosed herein.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
  a multilayer body including a plurality of dielectric layers that are stacked on one another, a first main surface and a second main surface facing each other, a first side surface and a second side surface facing each other, and a first end surface and a second end surface facing each other;
  inner electrodes stacked such that the inner electrodes and the plurality of dielectric layers are alternately arranged;
  outer electrodes disposed on at least the first end surface and the second end surface; wherein
  the inner electrodes include a first inner electrode, a second inner electrode, a third inner electrode, a fourth inner electrode, and a fifth inner electrode;
  the first inner electrode, the second inner electrode, the third inner electrode, the fourth inner electrode, and the fifth inner electrode are disposed on different planes;
  the first inner electrode includes a first end and a second end, the first end of the first inner electrode extending to the first end surface;
  the second inner electrode includes a first end and a second end, the first end of the second inner electrode extending to the second end surface;

the third inner electrode is arranged alternately with each of the first inner electrode and the second inner electrode;

the third inner electrode includes a first end and a second end that do not extend to the first end surface or to the second end surface;

the fourth inner electrode is located between the first inner electrode or the second inner electrode that is closest to the first main surface and the fifth inner electrode;

the fourth inner electrode is located between the first inner electrode or the second inner electrode that is closest to the second main surface and the fifth inner electrode;

the fourth inner electrode includes a first portion located near the first end surface and a second portion located near the second end surface, the first portion and the second portion of the fourth inner electrode are spaced apart from each other in a center portion of the multilayer body in a length direction of the multilayer body, the first portion and the second portion of the fourth inner electrode do not extend to the first end surface or to the second end surface;

the fifth inner electrode is located closest to the first main surface of the multilayer body, and is located closest to the second main surface of the multilayer body;

the fifth inner electrode includes a first portion located near the first end surface and a second portion located near the second end surface, the first portion and the second portion of the fifth inner electrode are spaced apart from each other in the center portion of the multilayer body in the length direction of the multilayer body, an end of the first portion of the fifth inner electrode, which is closer to the first end surface, extends to the first end surface, an end of the second portion of the fifth inner electrode, which is closer to the second end surface, extends to the second end surface;

a first auxiliary electrode is disposed on a same plane as the first inner electrode and spaced apart from the first inner electrode;

a second auxiliary electrode is disposed on a same plane as the second inner electrode and spaced apart from the second inner electrode;

a third auxiliary electrode is disposed on a same plane as the third inner electrode and includes a first portion and a second portion spaced apart from each other with the third inner electrode therebetween;

a fourth auxiliary electrode is disposed on a same plane as the fourth inner electrode and includes a first portion and a second portion such that the first portion and the second portion of the fourth auxiliary electrode are spaced apart from the first portion and the second portion of the fourth inner electrode, respectively;

the first auxiliary electrode extends to the second end surface;

the second auxiliary electrode extends to the first end surface;

the first portion of the third auxiliary electrode extends to the first end surface;

the second portion of the third auxiliary electrode extends to the second end surface;

the first portion of the fourth auxiliary electrode extends to the first end surface;

the second portion of the fourth auxiliary electrode extends to the second end surface.

2. The multilayer ceramic capacitor according to claim 1, wherein the first end of the first inner electrode includes a first end portion with a smaller length in a width direction between the first side surface and the second side surface than a center portion of the first inner electrode in a length direction of the first inner electrode; and the second end of the first inner electrode includes a second end portion with a smaller length in the width direction than the center portion of the first inner electrode in the length direction of the first inner electrode.

3. The multilayer ceramic capacitor according to claim 1, wherein the first end of the second inner electrode includes a third end portion with a smaller length in a width direction between the first side surface and the second side surface than a center portion of the second inner electrode in a length direction of the second inner electrode; and the second end of the second inner electrode includes a fourth end portion with a smaller length in the width direction than the center portion of the second inner electrode in the length direction of the second inner electrode.

4. The multilayer ceramic capacitor according to claim 1, wherein the first end of the third inner electrode includes a fifth end portion with a smaller length in a width direction between the first side surface and the second side surface than a center portion of the third inner electrode in the length direction; and the second end of the third inner electrode includes a sixth end portion with a smaller length in the width direction than the center portion of the third inner electrode in the length direction.

5. The multilayer ceramic capacitor according to claim 1, wherein the first portion of the fourth inner electrode includes a seventh end portion with a smaller length in a width direction between the first side surface and the second side surface than an end portion opposite to the seventh end portion, the end portion being farther away from the first end surface than the seventh end portion; and the second portion of the fourth inner electrode includes an eighth end portion with a smaller length in the width direction than an end portion opposite to the eighth end portion, the end portion being farther away from the second end surface than the eighth end portion.

6. The multilayer ceramic capacitor according to claim 1, wherein the first portion of the fifth inner electrode includes a ninth end portion with a smaller length in a width direction between the first side surface and the second side surface than an end portion opposite to the ninth end portion, the end portion being farther away from the first end surface than the ninth end portion; and the second portion of the fifth inner electrode includes a tenth end portion with a smaller length in the width direction than an end portion opposite to the tenth end portion, the end portion being farther away from the second end surface than the tenth end portion.

7. The multilayer ceramic capacitor according to claim 1, wherein lengths A, B, C, D, E, F, G, H, I and J are the same or substantially the same, wherein:

A is a length of the first end of the first inner electrode in a width direction between the first side surface and the second side surface;

B is a length of the second end of the first inner electrode in the width direction;
C is a length of the first auxiliary electrode in the width direction;
D is a length of the first end of the second inner electrode in the width direction;
E is a length of the second end of the second inner electrode in the width direction;
F is a length of the second auxiliary electrode in the width direction;
G is a length of the first end of the third inner electrode in the width direction;
H is a length of the second end of the third inner electrode in the width direction;
I is a length of the first portion of the third auxiliary electrode in the width direction; and
J is a length of the second portion of the third auxiliary electrode in the width direction.

8. The multilayer ceramic capacitor according to claim 1, wherein
a length of the second end of the first inner electrode in a width direction between the first side surface and the second side surface is smaller than a length of the first end of the first inner electrode in the width direction and is smaller than a length of the first auxiliary electrode in the width direction;
a length of the second end of the second inner electrode in the width direction is smaller than a length of the first end of the second inner electrode in the width direction and is smaller than a length of the second auxiliary electrode in the width direction; and
a length of the first end of the third inner electrode in the width direction, a length of the second end of the third inner electrode in the width direction, a length of the first portion of the third auxiliary electrode in the width direction, and a length of the second portion of the third auxiliary electrode in the width direction are each smaller than the length of the first end of the first inner electrode in the width direction, the length of the first auxiliary electrode in the width direction, the length of the first end of the second inner electrode in the width direction, and the length of the second auxiliary electrode in the width direction.

9. The multilayer ceramic capacitor according to claim 1, wherein when viewed in a direction in which the plurality of dielectric layers are stacked on one another, the second end of the first inner electrode extends so as to be closer to the second end surface than the second end of the third inner electrode, and the second end of the second inner electrode extends so as to be closer to the first end surface than the first end of the third inner electrode.

10. The multilayer ceramic capacitor according to claim 1, wherein the multilayer body has a substantially rectangular parallelepiped shape.

11. The multilayer ceramic capacitor according to claim 1, wherein the multilayer body is rounded at corner portions or ridge portions thereof.

12. The multilayer ceramic capacitor according to claim 1, wherein at least one of the first and second main surfaces, the first and second side surfaces, and the first and second end surfaces include irregularities.

13. The multilayer ceramic capacitor according to claim 1, wherein
portions where a wide portion in a center portion of the first inner electrode in the length direction is connected to the first end and the second end of the first inner electrode that are narrower than the wide portion, have angled corners or right-angle corners;
portions where a wide portion in a center portion of the second inner electrode in the length direction is connected to the first end and the second end of the second inner electrode that are narrower than the wide portion, have angled corners or right-angle corners; and
portions where a wide portion in a center portion of the third inner electrode in the length direction is connected to the first end and the second end of the third inner electrode that are narrower than the wide portion, have angled corners or right-angle corners.

14. The multilayer ceramic capacitor according to claim 1, wherein each of the first inner electrode, the second inner electrode and the third inner electrode include a gap between an end thereof and one of the first end surface and the second end surface.

15. The multilayer ceramic capacitor according to claim 1, wherein the multilayer body includes a first opposing-electrode portion where the first inner electrode and the third inner electrode face each other and the second inner electrode and the third inner electrode face each other.

16. The multilayer ceramic capacitor according to claim 15, wherein the multilayer body includes a second opposing-electrode portion where the fourth inner electrode and the fifth inner electrode face each other.

17. The multilayer ceramic capacitor according to claim 16, wherein the multilayer body includes side gap portions between first ends of the first opposing-electrode portion and the second opposing-electrode portion in a width direction and the first side surface and between second ends of the first opposing-electrode portion and the second opposing-electrode portion in the width direction and the second side surface.

18. The multilayer ceramic capacitor according to claim 1, wherein each of the outer electrodes includes an underlying electrode layer on the multilayer body and a plating layer on the underlying electrode layer.

19. The multilayer ceramic capacitor according to claim 18, wherein the plating layer includes a plurality of layers.

20. The multilayer ceramic capacitor according to claim 19, wherein the plating layer includes a Ni or Cu first plating layer and an Sn or Ag second plating layer.

* * * * *